US012734091B2

(12) United States Patent
Koerth et al.

(10) Patent No.: US 12,734,091 B2
(45) Date of Patent: Sep. 15, 2026

(54) SURGICAL TABLE INCLUDING CABLE TAKE-UP MECHANISM

(71) Applicant: American Sterilizer Company, Mentor, OH (US)

(72) Inventors: Michael E. Koerth, Newbury, OH (US); Peter J. Kozelj, Willoughby Hills, OH (US); John M. Kasunich, Mayfield Heights, OH (US)

(73) Assignee: American Sterilizer Company, Mentor, OH (US)

( * ) Notice: Subject to any disclaimer, the term of this patent is extended or adjusted under 35 U.S.C. 154(b) by 799 days.

(21) Appl. No.: 18/314,227

(22) Filed: May 9, 2023

(65) Prior Publication Data

US 2023/0363968 A1 Nov. 16, 2023

Related U.S. Application Data

(60) Provisional application No. 63/340,979, filed on May 12, 2022.

(51) Int. Cl.
*A61G 13/04* (2006.01)
*A61G 7/002* (2006.01)
(Continued)

(52) U.S. Cl.
CPC ............. *A61G 13/04* (2013.01); *A61G 7/012* (2013.01); *A61G 7/018* (2013.01); *A61G 13/06* (2013.01); *A61G 7/002* (2013.01); *A61G 13/02* (2013.01)

(58) Field of Classification Search
CPC ........ A61G 13/04; A61G 13/06; A61G 13/08; A61G 13/02; A61G 7/012; A61G 7/018; A61G 7/002
(Continued)

(56) References Cited

U.S. PATENT DOCUMENTS 2,341,273 A 2/1944 Helberg
2,353,562 A 7/1944 Hatcher
(Continued)

FOREIGN PATENT DOCUMENTS

EP 3678624 B1 * 10/2025 ............. H02G 11/00
EP 4522102 B1 * 3/2026 ............. A61G 13/04
(Continued)

OTHER PUBLICATIONS

International Search Report for corresponding PCT International Application No. PCT/US2023/021432 mailed Aug. 25, 2023.
(Continued)

*Primary Examiner* — Robert G Santos
(74) *Attorney, Agent, or Firm* — Renner, Otto, Boisselle & Sklar, LLP

(57) ABSTRACT

A surgical table includes a base, a tabletop, first and second frameworks, a cable, and a cable take-up mechanism. The first and second frameworks are moveable relative to one another to move the tabletop relative to the base in a first direction and a second direction that is opposite the first direction. The cable has a first end, a second end that is opposite the first end, and an intermediate portion. The first and second ends are mounted to the respective first and second frameworks. The cable take-up mechanism includes a constant-force spring coupled to the intermediate portion of the cable to take up slack in the cable as the first and second frameworks move relative to one another to move the tabletop relative to the base.

41 Claims, 24 Drawing Sheets

(51) Int. Cl.

| | |
|---|---|
| ***A61G 7/012*** | (2006.01) |
| ***A61G 7/018*** | (2006.01) |
| ***A61G 13/02*** | (2006.01) |
| ***A61G 13/06*** | (2006.01) |

(58) Field of Classification Search
USPC .......................................... 5/600, 611, 11
See application file for complete search history.

(56) References Cited

U.S. PATENT DOCUMENTS

| | | | | | |
|---|---|---|---|---|---|
| 2,955,149 | A | | 10/1960 | Gubernick | |
| 3,402,408 | A | * | 9/1968 | Hutt | A61G 7/002 5/617 |
| 3,436,769 | A | * | 4/1969 | Burst | A61G 7/002 5/616 |
| 3,798,684 | A | * | 3/1974 | Benoit | A61G 7/018 200/83 R |
| 4,313,729 | A | | 2/1982 | James | |
| 4,470,355 | A | | 9/1984 | Kunczynski | |
| 6,594,837 | B2 | * | 7/2003 | Khait | A61G 7/0005 5/5 |
| 6,659,935 | B2 | * | 12/2003 | Costanzo | A61G 11/00 5/610 |
| 6,730,850 | B2 | * | 5/2004 | Tsutsumi | H02G 11/00 174/111 |
| 6,896,344 | B2 | * | 5/2005 | Tsutsumi | H02G 11/00 248/51 |
| 9,050,119 | B2 | | 6/2015 | Devengenzo et al. | |
| 11,389,359 | B2 | * | 7/2022 | Clayton | A61G 13/04 |
| 11,400,005 | B2 | * | 8/2022 | Clayton | A61G 13/06 |
| 11,406,551 | B2 | * | 8/2022 | Clayton | A61G 7/005 |
| 11,446,195 | B2 | * | 9/2022 | Clayton | A61G 13/04 |
| 11,612,532 | B2 | * | 3/2023 | Obert | H02G 11/00 5/611 |
| 11,672,717 | B2 | * | 6/2023 | Clayton | A61G 7/012 5/610 |
| 12,121,477 | B2 | * | 10/2024 | Clayton | A61G 13/04 |
| 2002/0023297 | A1 | * | 2/2002 | Khait | A61G 7/0005 5/5 |
| 2002/0077525 | A1 | * | 6/2002 | Costanzo | A61G 11/00 600/22 |
| 2004/0000422 | A1 | * | 1/2004 | Tsutsumi | H02G 11/00 174/135 |
| 2004/0090159 | A1 | * | 5/2004 | Tsutsumi | H02G 11/006 312/330.1 |
| 2005/0076439 | A1 | * | 4/2005 | Khait | A61G 7/0573 5/933 |
| 2006/0042175 | A1 | * | 3/2006 | Crespi | H02G 11/006 52/111 |
| 2006/0134934 | A1 | | 6/2006 | Watanabe et al. | |
| 2006/0175073 | A1 | | 8/2006 | Terada | |
| 2020/0197249 | A1 | | 6/2020 | Clayton | |
| 2020/0345571 | A1 | | 11/2020 | Clayton et al. | |
| 2020/0383857 | A1 | | 12/2020 | Clayton et al. | |
| 2021/0000670 | A1 | | 1/2021 | Clayton | |
| 2021/0000671 | A1 | | 1/2021 | Clayton | |
| 2022/0000696 | A1 | | 1/2022 | Obert | |
| 2023/0263684 | A1 | * | 8/2023 | Clayton | A61G 13/06 5/610 |
| 2023/0363968 | A1 | * | 11/2023 | Koerth | A61G 13/04 |
| 2025/0041140 | A1 | * | 2/2025 | Clayton | A47B 9/20 |

FOREIGN PATENT DOCUMENTS

| | | | | | |
|---|---|---|---|---|---|
| GB | 2566076 | A | * | 3/2019 | A61G 13/04 |
| GB | 2566078 | A | * | 3/2019 | A61G 13/06 |
| GB | 2566079 | A | * | 3/2019 | A47B 9/20 |
| GB | 2566080 | A | * | 3/2019 | A61G 13/04 |
| GB | 2566082 | A | * | 3/2019 | H02G 11/00 |
| GB | 2566157 | A | * | 3/2019 | A61G 13/04 |
| GB | 2566158 | A | * | 3/2019 | A47B 9/20 |
| GB | 2566160 | A | * | 3/2019 | A61G 13/06 |
| GB | 2566157 | B | * | 10/2019 | A61G 13/06 |
| GB | 2566160 | B | * | 10/2019 | A61G 13/06 |
| JP | 2006-180619 | A | | 7/2006 | |
| WO | WO-2019043152 | A1 | * | 3/2019 | A47B 9/20 |
| WO | WO-2019043153 | A2 | * | 3/2019 | A61G 13/06 |
| WO | WO-2019043155 | A1 | * | 3/2019 | A61G 13/04 |
| WO | WO-2019043165 | A2 | * | 3/2019 | A61G 13/04 |
| WO | WO-2023219986 | A1 | * | 11/2023 | A61G 13/06 |

OTHER PUBLICATIONS

Written Opinion for corresponding PCT International Application No. PCT/US2023/021432 mailed Aug. 25, 2023.

* cited by examiner

SURGICAL TABLE INCLUDING CABLE TAKE-UP MECHANISM

This application claims priority to U.S. Patent Application No. 63/340,979, filed May 12, 2022, which is hereby incorporated herein by reference in its entirety.

FIELD OF INVENTION

This application relates generally to a surgical table, and more particularly to a surgical table including a cable take-up mechanism for taking up slack in a cable of the surgical table.

BACKGROUND

Surgical tables employ various cable take-up mechanisms to take up slack in cables when for example the tabletop of the surgical table is raised or lowered relative to the base of the surgical table. Examples of cable take-up mechanisms include in-line connection spring-loaded systems, coiled cords, energy chains, hydraulic powered systems, cables sliding in grooves, among others. The main shortcoming of current spring-loaded systems is the inability to provide a constant force or tension on the cable throughout the range of motion of the cable. The drawback to hydraulic cylinder powered systems is accommodating the size of the cylinder and the requirement for a fluid pump. The shortcoming of energy chains and sliding groove arrangements is that they usually require linear movement of one component relative to another, making them incompatible for surgical tables lacking volumes that can accommodate such movement.

Accordingly, there remains a need for further contributions in this area of technology.

SUMMARY OF INVENTION

The application relates to surgical tables that employ components that address one or more of the foregoing problems. According to one aspect of the invention, a cable take-up mechanism includes a constant-force spring that provides or aids in providing a constant or near constant tension in a cable that would otherwise experience slack between two moving frameworks of the surgical table. In another aspect of the invention, a surgical table may include a sheave that enables up to twice as much variation in cable length, that is, up to two times as much slack may be taken-up than if no sheave was used. In yet another aspect, a surgical table may include a curved guide segment that enables the cable to travel along a changing cable travel path in two different directions, for example parallel to a longitudinal direction of a tabletop to a direction that is inclined relative to the longitudinal direction as the tabletop moves relative to a base of the surgical table. The surgical table may include any one or more of the foregoing features to reduce cable slack and/or maintain a tension in the cable, to reduce the volumetric footprint of the cable take-up mechanism particularly where the cable must be fed to components within the structure of the tabletop and/or supporting table framework, and/or to enable the cable to change travel paths for example to utilize space in other volumes of the surgical table.

According to one aspect of the invention, a surgical table includes a base; a tabletop; a first framework and a second framework moveable relative to one another to move the tabletop relative to the base in a first direction and a second direction that is opposite the first direction; a cable having a first end, a second end that is opposite the first end, and an intermediate portion, the first and second ends being mounted to the respective first and second frameworks; and a cable take-up mechanism including a constant-force spring coupled to the intermediate portion of the cable to take up slack in the cable as the first and second frameworks move relative to one another to move the tabletop relative to the base.

Embodiments of the invention may include one or more of the following additional features separately or in combination.

The constant-force spring may have a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

The constant-force spring may be configured to extend the coupled spring-cable connection relative to the coupled spring-second framework connection as the tabletop moves in the first direction relative to the base, and to retract the coupled spring-cable connection relative to the coupled spring-second framework connection as the tabletop moves in the second direction relative to the base.

The first framework may include an upper column element of a column including upper and lower telescoping column elements, and the tabletop may be connected to the second framework, and the first end of the cable may be mounted to the upper column element at a cable-first framework connection, and the tabletop together with the second framework may be moveable relative to the cable-first framework connection as the first and second frameworks move relative to one another.

The second framework may include a trend frame and a tilt frame, and the tabletop may be connected to the tilt frame, and the tilt frame together with the tabletop connected thereto may be pivotably movable about a tilt axis that extends through the trend frame and the tilt frame.

The first direction and the second direction that the tabletop moves relative to the base may be respectively a vertically upward direction and a vertically downward direction.

At least one electrical actuator may be provided for moving the first framework and the second framework relative to one another.

The constant-force spring may be configured to maintain a constant tension in the cable as the tabletop moves relative to the base in the first and second directions.

The tabletop may be connected to the second framework, and the constant-force spring may be coupled to the intermediate portion of the cable to form a coupled spring-cable connection that is arranged for movement within the outermost dimensions of the tabletop and/or the second framework.

The cable take-up mechanism may include a sheave rotatably coupled to the constant-force spring, and wherein the cable slidably wraps around the sheave.

The cable may slidably wrap around the sheave in the range of 5 to 180 degrees.

The tabletop may be connected to the second framework, and the sheave may be arranged for movement within the outermost dimensions of the tabletop and/or the second framework as the tabletop moves relative to the base in the first and second directions.

The constant-force spring may have a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

The constant-force spring may be configured to extend the sheave relative to the coupled spring-second framework connection as the tabletop moves in the first direction relative to the base, and to retract the sheave relative to the coupled spring-second framework connection as the tabletop moves in the second direction relative to the base.

The cable take-up mechanism may include a channeled frame mounted to the second framework and a bearing block constrained to sliding linear movement via a linear channel of the channeled frame, and the constant-force spring may be coupled to the intermediate portion of the cable by the bearing block.

The tabletop may be connected to the second framework, and the bearing block may be arranged for movement within the outermost dimensions of the tabletop and/or the second framework as the tabletop moves relative to the base in the first and second directions.

The cable take-up mechanism may include a sheave rotatably mounted to the bearing block, and the coupled spring-cable connection may include the cable slidably wrapping around the sheave.

The tabletop may be connected to the second framework, and the bearing block with the sheave rotatably mounted thereto may be arranged for movement within the outermost dimensions of the tabletop and/or the second framework as the tabletop moves relative to the base in the first and second directions.

The bearing block may slide along a translation axis that is parallel to a longitudinal direction of the tabletop.

The constant-force spring may have a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

The constant-force spring may be configured to extend the bearing block relative to the coupled spring-second framework connection as the tabletop moves in the first direction relative to the base, and to retract the bearing block relative to the coupled spring-second framework connection as the tabletop moves in the second direction relative to the base.

A first end portion of the constant-force spring may include a coil portion and a second end portion of the constant-force spring may include a free end, and the coil portion may be fitted on a spool rotatably mounted to the second framework to form a coupled spring-second framework connection and the free end may be coupled to the intermediate portion of the cable for movement together as a coupled spring-cable connection.

The coil portion may be configured to uncoil to extend the coupled spring-cable connection relative to the coupled spring-second framework connection as the tabletop moves in the first direction relative to the base, and to coil to retract the coupled spring-cable connection relative to the coupled spring-second framework connection as the tabletop moves in the second direction relative to the base.

The tabletop may be connected to the second framework, and the cable take-up mechanism may include a curved guide segment around which the cable bends to change a travel path direction of the cable as the tabletop moves in the first and second directions relative to the base.

The curved guide segment may be configured to change the travel path direction from parallel to a longitudinal direction of the tabletop to a direction that is inclined relative to the longitudinal direction as the tabletop moves in the first and second directions relative to the base.

The tabletop may be connected to the second framework, and the second framework may be configured to pivot about a tilt axis extending in a longitudinal direction of the tabletop and at least a portion of the cable extends downward through an opening in the second framework to the first framework along a cable travel axis that is transverse to the tilt axis and offset from the tilt axis.

The tabletop may be connected to the second framework, and the second framework may be configured to pivot about a trend axis extending transverse to a longitudinal direction of the tabletop and at least a portion of the cable may extend downward through an opening in the second framework to the first framework along a cable travel axis that is transverse to the trend axis and offset from the trend axis.

According to another aspect of the invention, a surgical table includes a base; a tabletop; a first framework and a second framework moveable relative to one another to move the tabletop relative to the base in a first direction and a second direction that is opposite the first direction; a cable having a first end, a second end that is opposite the first end, and an intermediate portion, the first and second ends being mounted to the respective first and second frameworks; and, a cable take-up mechanism including a spring coupled to the intermediate portion of the cable to take up slack in the cable as the first and second frameworks move relative to one another to move the tabletop relative to the base; wherein the cable take-up mechanism includes a sheave rotatably coupled to the spring, and wherein the cable slidably wraps around the sheave.

Embodiments of the invention may include one or more of the following additional features separately or in combination.

The cable may slidably wrap around the sheave in the range of 5 to 180 degrees.

The tabletop may be connected to the second framework, and the sheave may be arranged for movement within the outermost dimensions of the tabletop and/or the second framework as the tabletop moves relative to the base in the first and second directions.

The spring may have a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

The spring may be configured to extend the sheave relative to the coupled spring-second framework connection as the tabletop moves in the first direction relative to the base, and to retract the sheave relative to the coupled spring-second framework connection as the tabletop moves in the second direction relative to the base.

The cable take-up mechanism may include a channeled frame mounted to the second framework and a bearing block constrained to sliding linear movement via a linear channel of the channeled frame, and the constant-force spring may be coupled to the intermediate portion of the cable by the bearing block.

The tabletop may be connected to the second framework, and the bearing block may be arranged for movement within the outermost dimensions of the tabletop and/or the second framework as the tabletop moves relative to the base in the first and second directions.

The cable take-up mechanism may include a sheave rotatably mounted to the bearing block, and the coupled spring-cable connection may include the cable slidably wrapping around the sheave.

The tabletop may be connected to the second framework, and the bearing block with the sheave rotatably mounted thereto may be arranged for movement within the outermost dimensions of the tabletop and/or the second framework as the tabletop moves relative to the base in the first and second directions.

The bearing block may slides along a translation axis that is parallel to a longitudinal direction of the tabletop.

The spring may have a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

The spring may be configured to extend the bearing block relative to the coupled spring-second framework connection as the tabletop moves in the first direction relative to the base, and to retract the bearing block relative to the coupled spring-second framework connection as the tabletop moves in the second direction relative to the base.

The spring may include a tension spring, a compression spring, or a constant-force spring.

According to another aspect of the invention, a surgical table includes a base; a tabletop; a first framework and a second framework moveable relative to one another to move the tabletop relative to the base in a first direction and a second direction that is opposite the first direction; a cable having a first end, a second end that is opposite the first end, and an intermediate portion, the first and second ends being mounted to the respective first and second frameworks; and, a cable take-up mechanism including a spring coupled to the intermediate portion of the cable to take up slack in the cable as the first and second frameworks move relative to one another to move the tabletop relative to the base; wherein the tabletop is connected to the second framework, and the cable take-up mechanism includes a curved guide segment around which the cable bends to change a travel path direction of the cable as the tabletop moves in the first and second directions relative to the base.

Embodiments of the invention may include one or more of the following additional features separately or in combination.

The curved guide segment may be configured to change the travel path direction from parallel to a longitudinal direction of the tabletop to a direction that is inclined relative to the longitudinal direction as the tabletop moves in the first and second directions relative to the base.

The spring may include a tension spring, a compression spring, or a constant-force spring.

The cable may include one or more of wires, cables, hoses, and/or lines, and/or bundles or harnesses of wires, cables, hoses, and/or lines.

The cable may be configured to transmit one or more of power, ground, control signals, communication signals, and/or fluids.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
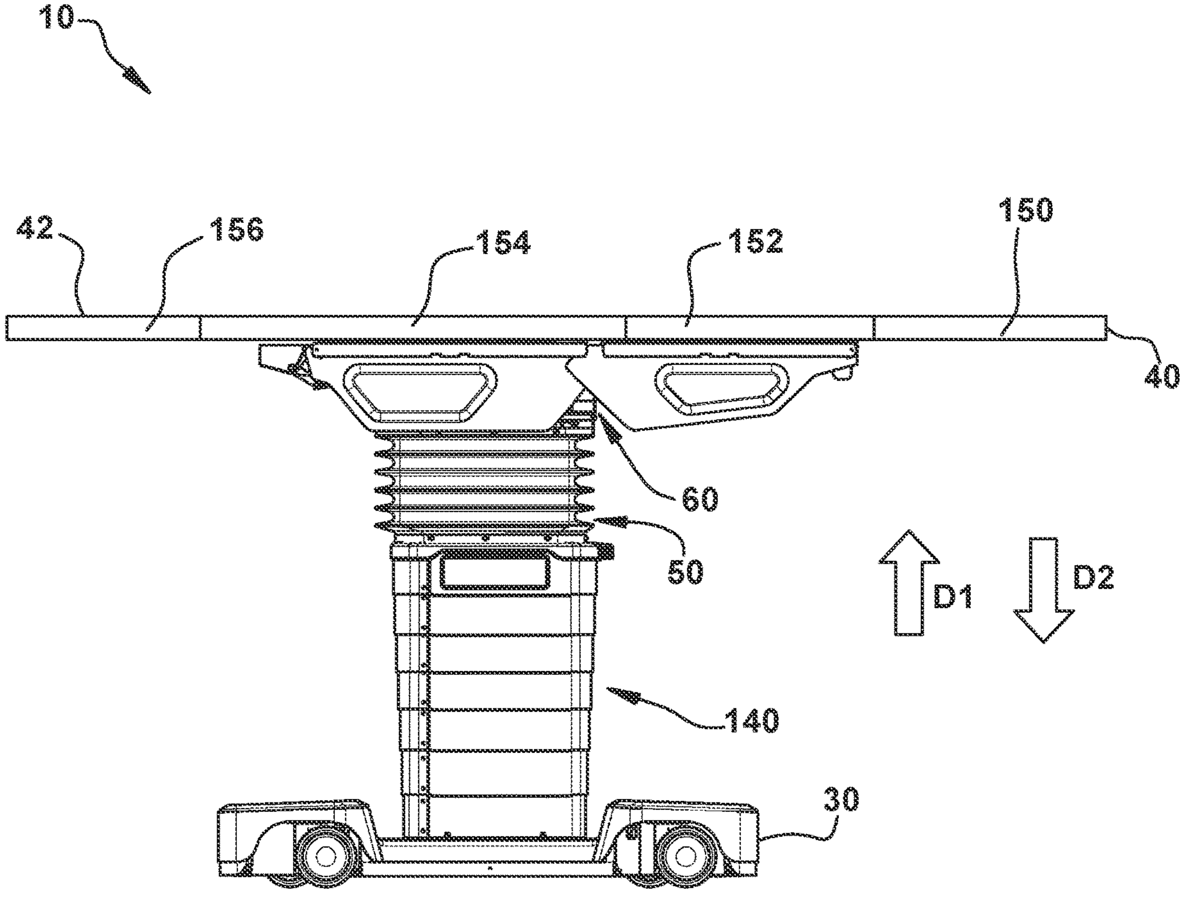
FIG. 1 is a schematic side view of a surgical table in accordance with an embodiment of the invention.
Figure 2:
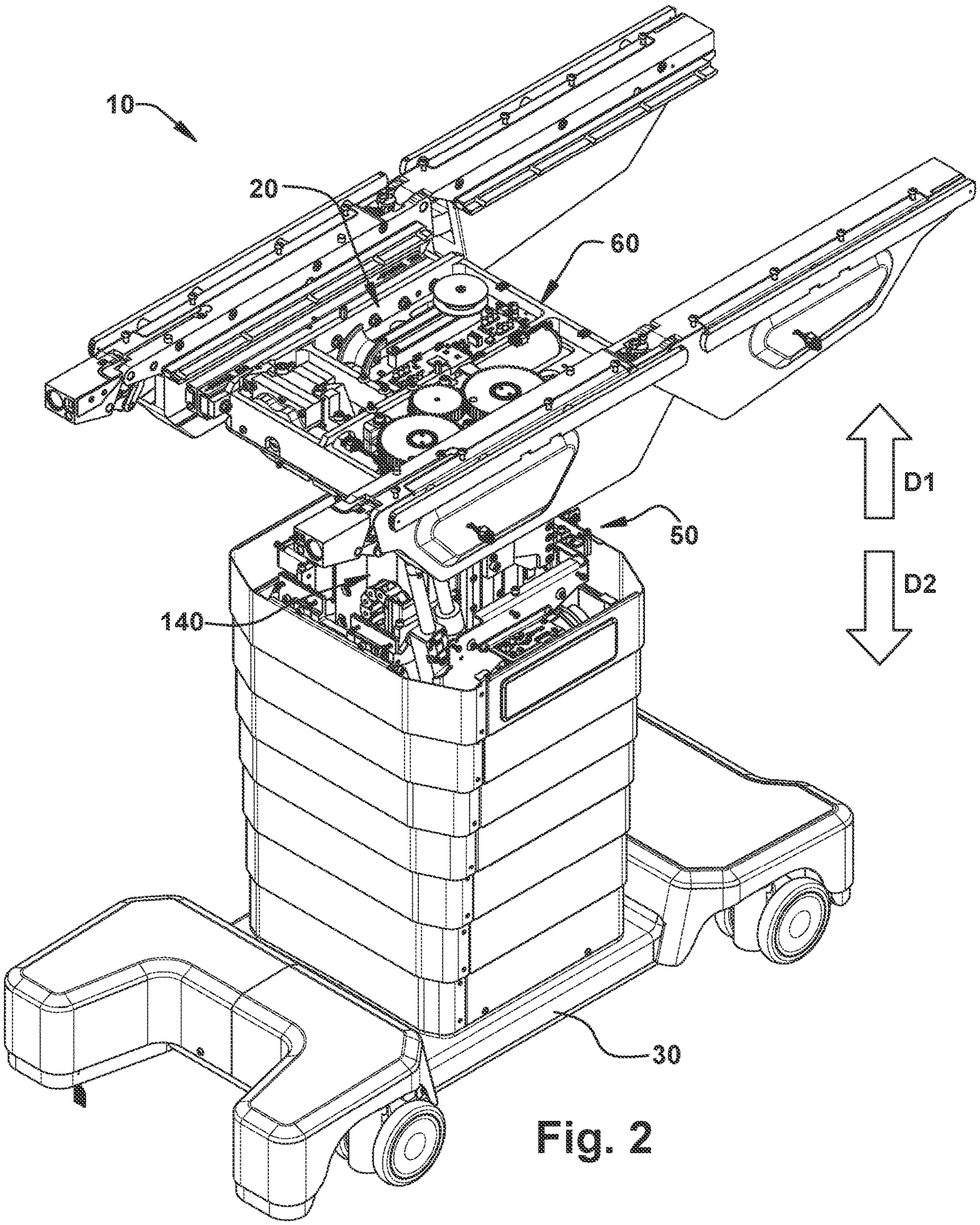
FIG. 2 is a perspective view of the FIG. 1 surgical table with a tabletop omitted to show a cable take-up mechanism in accordance with an embodiment of the invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIGS. 1-13 show a surgical table 10 and a cable take-up mechanism 20 (FIGS. 12 and 13) thereof in accordance with an embodiment of the invention. The surgical table 10 includes a base 30, a tabletop 40, a column framework 50, and a table framework 60 moveable relative to one another to move the tabletop 40 relative to the base 30 in a first direction D1 and a second direction D2 that is opposite the first direction D1. The surgical table 10 further includes a cable 70, shown for example in FIGS. 10, 14 and 16, for transmitting one or more of power, ground, control signals, communication signals, fluids, among other things. As used herein, "cable" includes wires, cables, hoses, and/or lines, and/or bundles or harnesses of wires, cables, hoses, and/or lines. Cables may be in the form of electrical cables and/or fiber optic cables. Hoses may be in the form of hydraulic and/or pneumatic hoses. In the illustrated embodiment, the cable 70 is in the form of a cable bundle that includes power, CAN communication, and earth ground wires from a trend/fallback PCB located in the base and/or column framework 50 to PCBs located in the table framework 60 and/or the tabletop 40. Earth ground may be used for example to BOND the tabletop 40 to the base 30 and/or column framework 50.

The cable 70 has a first end 72, a second end 74 that is opposite the first end 72, and an intermediate portion 76. The first end 72 and the second end 74 are mounted respectively to the column framework 50 and the table framework 60. The cable take-up mechanism 20 includes a constant-force spring 90, shown for example in FIGS. 12 and 13, coupled to the intermediate portion 76 of the cable 70 to take up slack in the cable 70 as the column framework 50 and the table framework 60 move relative to one another to move the tabletop 40 relative to the base 30. As shown in FIGS. 10-13, the surgical table 10 may also or alternately include a sheave 120 rotatably coupled to the spring 90, where the cable 70 slidably wraps around the sheave 120. The surgical table 10 may also or alternately include a curved guide segment 130 around which the cable 70 bends to change the direction of the cable 70 as the tabletop 40 moves in the first and second directions D1, D2 relative to the base 30.

As will be described in greater detail below, several advantages may be realized by the components of the surgical table 10 in accordance with the invention. For example, the cable take-up mechanism 20 by means of the constant-force spring 90 may provide or aid in providing a constant tension in the cable 70 that would otherwise experience slack between first and second frameworks of a surgical table, such as the column framework 50 and the table framework 60 of the illustrated surgical table 10. In some embodiments, the sheave 120 may enable up to twice as much variation in cable length, that is, up to two times as much slack may be taken-up than if no sheave 120 was used. The curved guide segment 130 may enable the cable 70 to travel along a changing cable travel path in two different directions, for example parallel to a longitudinal direction of the tabletop 40 to a direction that is inclined relative to the longitudinal direction as the tabletop 40 moves in the first and second directions D1, D2 relative to the base 30. The surgical table 10 in accordance with embodiments of the invention may include any one or more of the foregoing features to reduce cable slack and/or maintain a tension in the cable, to reduce the volumetric footprint of the cable take-up mechanism 20 particularly where the cable 70 must be fed to components within the structure of the tabletop 40 and/or the table framework 60, and/or to enable the cable 70 to change travel paths for example to utilize space in other volumes of the surgical table 10.

Turning initially then to FIG. 1, the surgical table 10 includes the base 30, a column 140 of adjustable height that is mounted on and extends from the base 30, and the tabletop 40. The tabletop 40 provides a patient support surface 42. The surgical table 10 may include a mechanism for inclining the tabletop 40 relative to the column 140 by inclining the tabletop 40 about transverse and longitudinal horizontal axes of the tabletop 40. Inclination about the transverse horizontal axis of the tabletop 40 is referred to in the art as "trending", while inclination about the longitudinal horizontal axis of the tabletop 40 is referred to as "tilting". In the illustrated surgical table 10, compound movements also are possible, in which the tabletop 40 is inclined about both the transverse and longitudinal axes of the tabletop 40 at the same time. As used herein, the longitudinal axis of the tabletop 40 is the major axis of the tabletop 40 and the transverse axis of the tabletop 40 is the orthogonal minor axis of the tabletop 40. The longitudinal direction of the tabletop 40 is parallel to the major axis and the transverse direction of the tabletop 40 is parallel to the minor axis. That is, the transverse direction of the tabletop 40 is perpendicular to, or orthogonal to, the longitudinal direction of tabletop 40. Thus, in FIG. 1, the longitudinal axis is left-right across the page and the transverse axis is into and out of the page.

Figure 3:
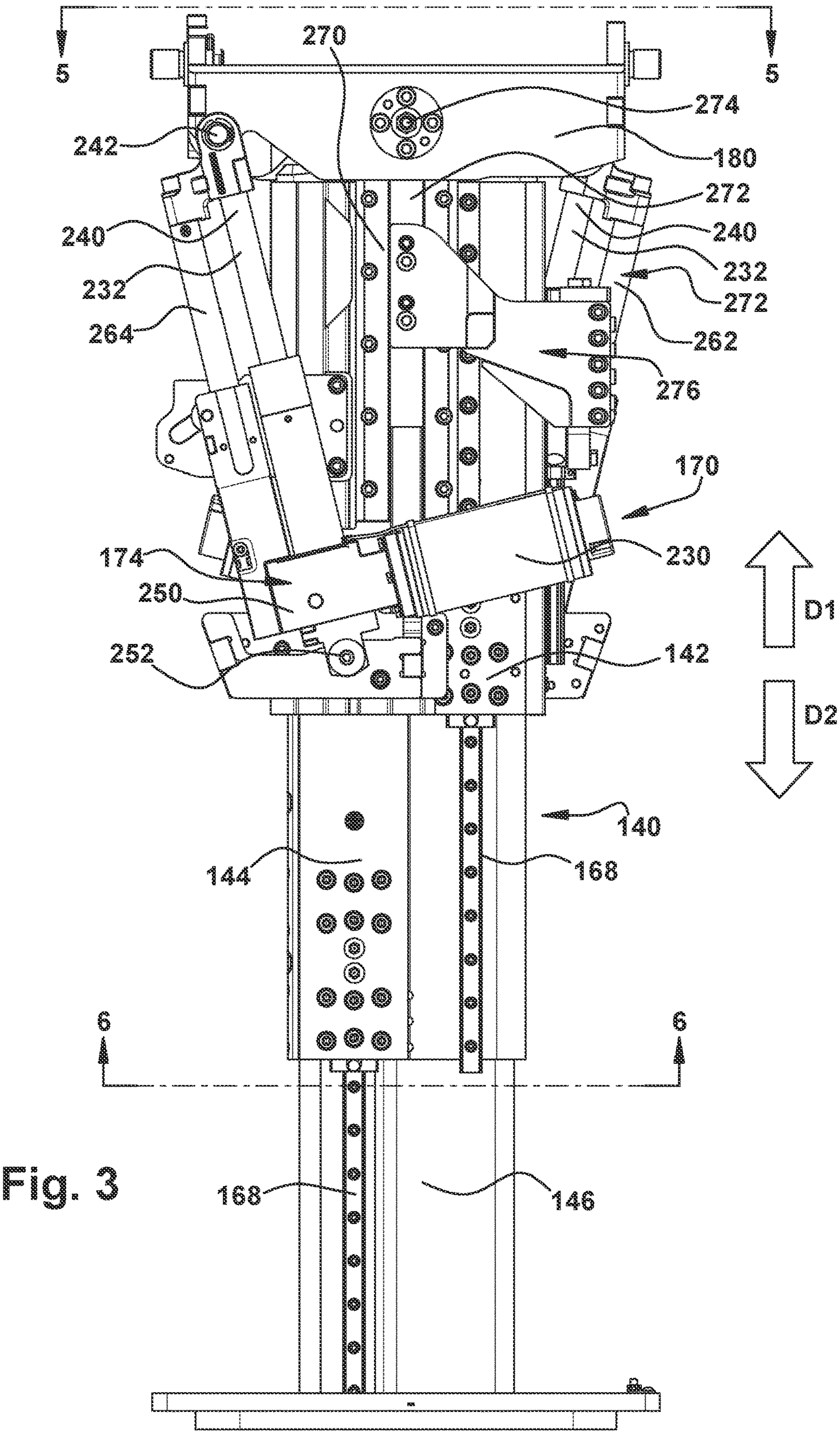
FIG. 3 is a side elevation view of a column, trend frame, and an electrical actuator of the FIG. 1 surgical table.

The tabletop 40 includes five sections, namely a head section 150, an upper torso section 152, a lower torso section 154 and a pair of laterally adjacent leg sections 156. The lower torso section 154 is coupled to the column 140. As shown in FIG. 3, the column 140 includes a plurality of column elements 142, 144, 146 which form a telescoping assembly; namely an upper or outer column element 142, an intermediate column element 144, and a lower or inner column element 146. The telescoping assembly surrounds an electrical actuator 160, which is shown schematically and in phantom in FIG. 6, for raising and lowering the column 140 and thus the tabletop 40 relative to the base 30 in the first and second directions D1, D2. The electrical actuator 160 includes a column drive mechanism located within the inner column element 146 of the plurality of column elements 142, 144, 146.

Figure 5:
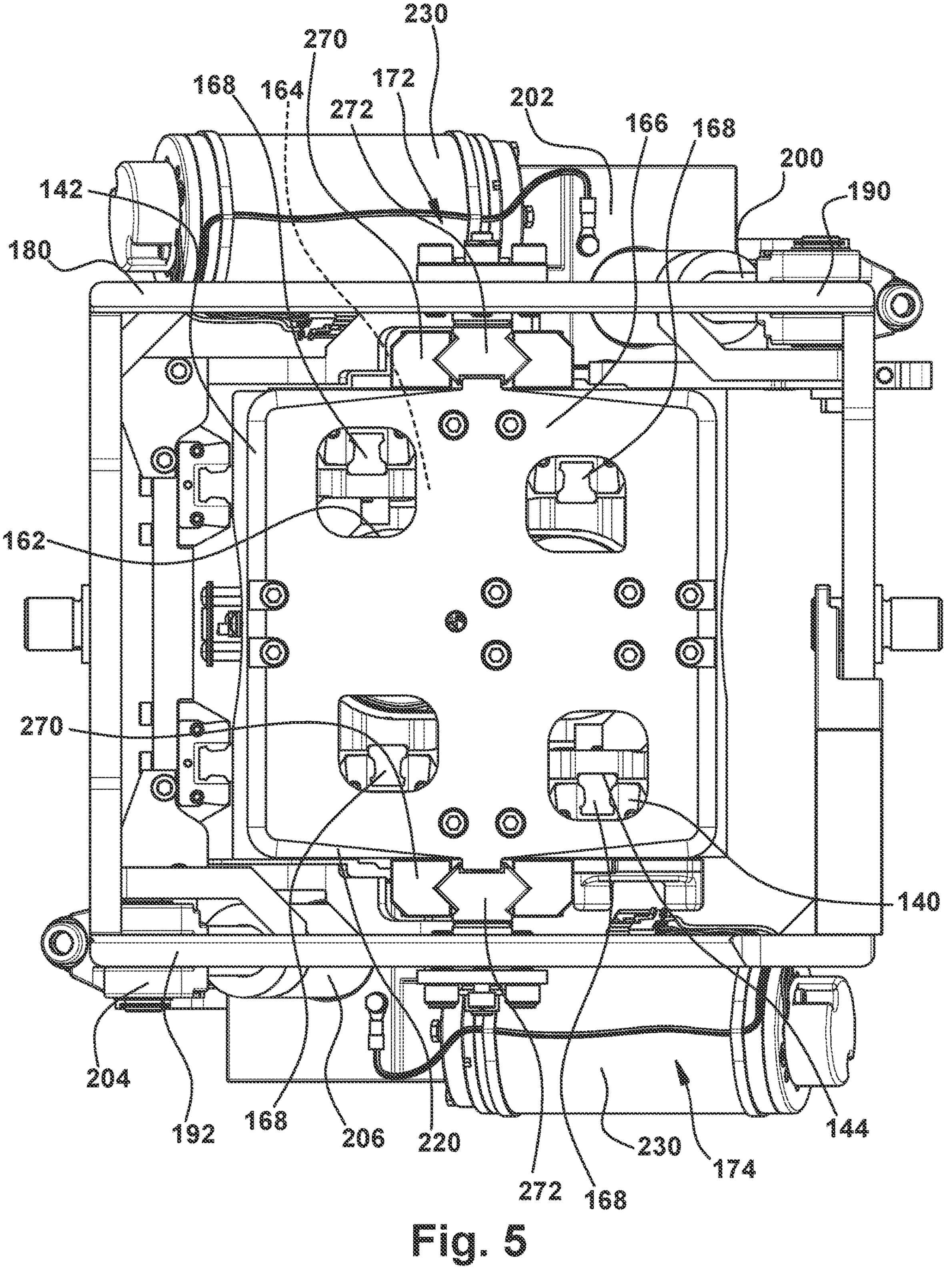
FIG. 5 is a top plan view of the column, trend frame, and the electrical actuator of the FIG. 1 surgical table.
Figure 6:
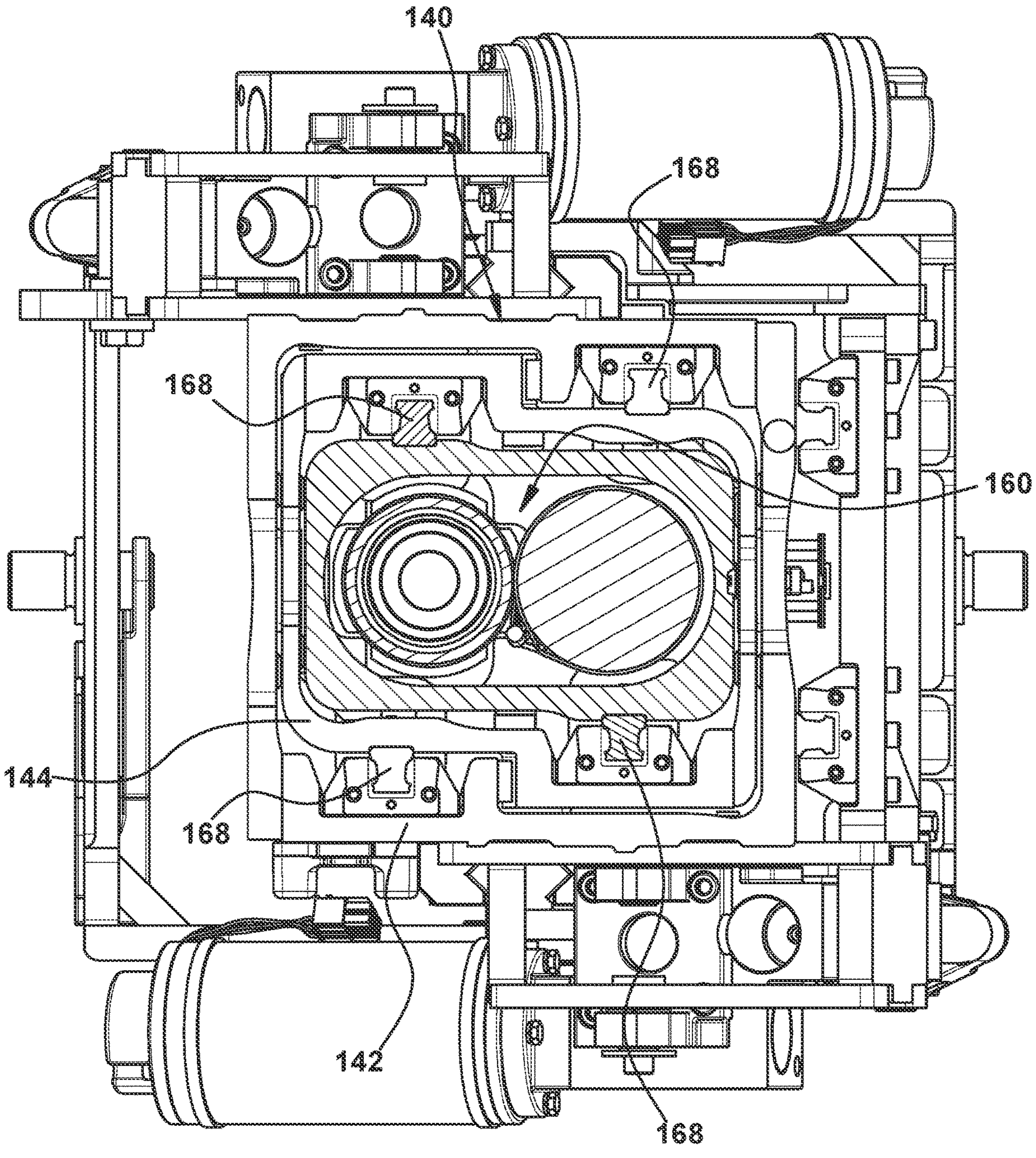
FIG. 6 is a bottom view from below the column of the FIG. 1 surgical table.

The electrical actuator 160 is coupled between the outer column element 142 and the base 30 and drives the outer column element 142 upwardly and downwardly relative to the base 30, with the plurality of column elements 142, 144, 146 being coupled together so as to be raised or lowered in synchronism. As shown in FIG. 5, the electrical actuator 160 has an upper end 162 coupled to a drive surface 164 affixed to the outer column element 142 of the plurality of column elements, and the drive surface 164 is provided by a plate 166 located inwardly of, and affixed to, the outer column element 142. As shown in FIGS. 5 and 6, the column 140 may include a plurality of linear motion guide units 168, for example recirculating ball-type linear guides, between each pair of adjacent column elements 142, 144, 146 to aid in the telescoping movement.

With reference to FIGS. 3-9, a first actuator mechanism 170 is coupled to the trend frame 180 and arranged to raise and lower the trend frame 180 relative to the column 140 and to rotate the trend frame 180 about a trend axis T-T extending in a transverse direction across the tabletop 40, such raising and lowering, and/or such rotating, resulting in moving the tabletop 40 relative to the base 30 in the first and second directions D1, D2. The first actuator mechanism 170 is external of the column 140. The first actuator mechanism 170 includes first and second electrical actuators 172, 174. The first actuator 172 is connected to a first portion 190 at one end of the trend frame 180 and the second actuator 174 is connected to a second portion 192 located at an opposite end of the trend frame 180. The first and second portions 190, 192 are mutually spaced and located on opposite sides of the trend axis T-T and on opposite sides of a tilt axis X-X extending in a longitudinal direction of the tabletop. The trend frame 180 is substantially rectangular and the first and second portions 190, 192 are located at diagonally opposite corners of the trend frame 180, as shown in FIG. 5.

The first and second actuators 172, 174 are coupled between the column 140 and the trend frame 180 for causing movement of the trend frame 180 relative to the column 140. The first actuator 172 has an upper first end 200 connected to the first portion 190 of the trend frame 180, and a lower second end 202 coupled to the column 140. The second actuator 174 has an upper first end 204 connected to the second portion 192 of the trend frame 180 and a lower second end 206 coupled to the column 140. The second end 202, 206 of each of the first and second actuators 172, 174 is coupled to an external surface 220 of the column 140. The first and second actuators 172, 174 each include an electric motor 230, which includes an elongate element 232, for example a leadscrew 232, having an upper end 240 connected by a pivot joint 242 to the trend frame 180 and a drive assembly 250 adapted to rotate the leadscrew 232 to extend, or retract, the leadscrew 232, so as respectively to raise, or lower, the respective first and second portions 190, 192 of the trend frame 180.

The drive assembly 250 of each first and second actuator 172, 174 is pivotally connected to the trend frame 180 by a pivot mount 252. Therefore, each of the first and second actuators 172, 174, including a respective electric motor 230, elongate element 232, and drive assembly 250, and a respective one of first and second stabilizers 262, 264, is rotatable about the respective pivot mount 252. The first and second actuators 172, 174 can be operated independently so as to be driven in the same or opposite directions. Therefore, the rotational orientation of the first and second actuators 172, 174 about the respective pivot mount 252 can be different.

Figure 4:
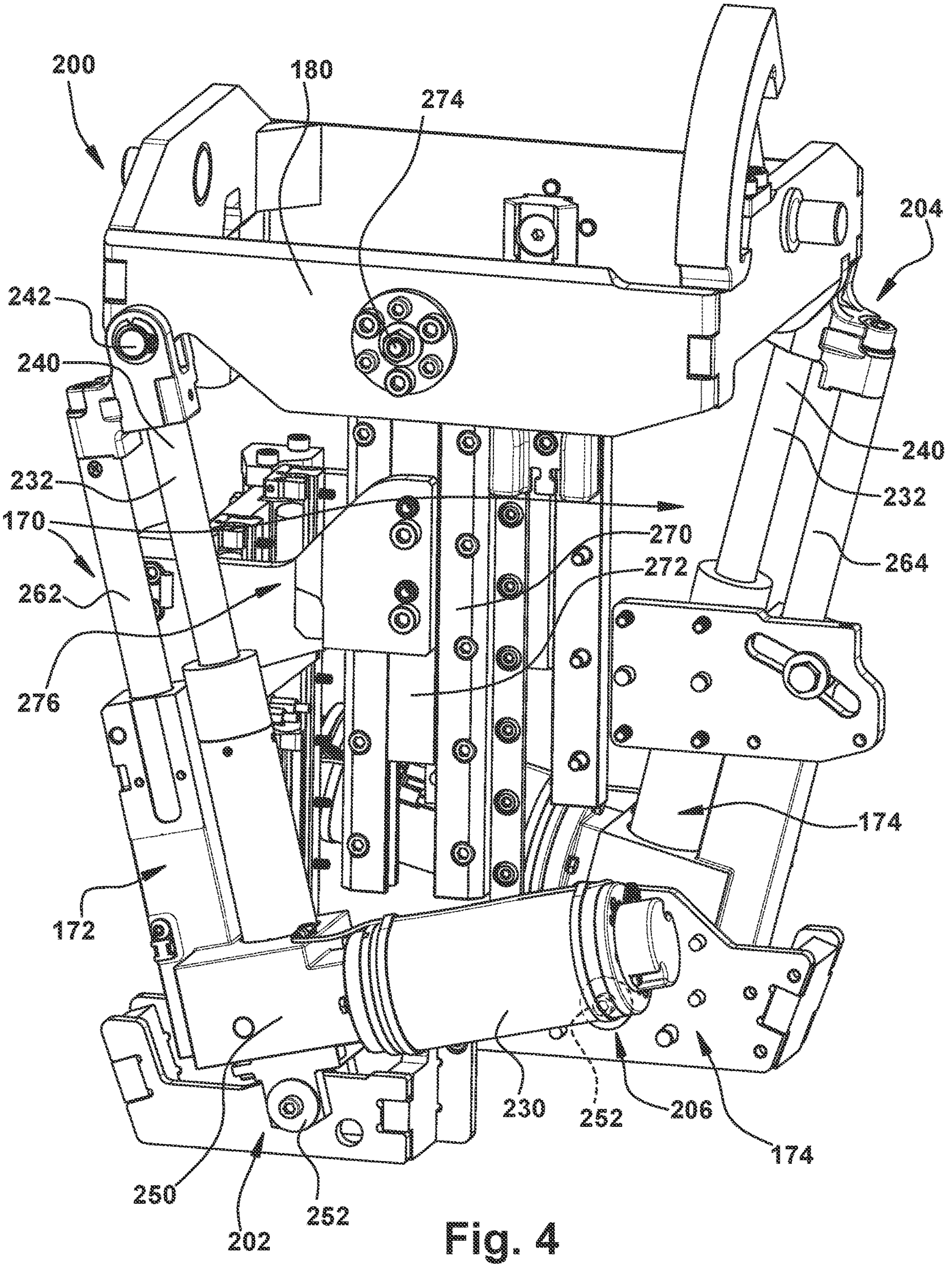
FIG. 4 is an enlarged side view, the opposite side of that shown in FIG. 3, of the trend frame and the electrical actuator.

A pair of fixed linear guide elements 270, for example elongate channels, may be fixed to a portion of the column 140 such as the outer column element 142, to guide respectively a pair of movable linear guide elements 272, such as sliders, where the movable linear guide elements 272 are coupled to the trend frame 180 at respective trend pivots 274, thereby ensuring the trend pivots 274 move vertically, that is, up and down in FIGS. 3 and 4. A brace mechanism 276, C-shape in top plan view, may be coupled to, and mounted between, the movable linear guide elements 272. The free ends of the brace mechanism 276 may be rigidly affixed, for example by bolts or screws, to the respective movable linear guide members 272, and thereby coupled to the trend frame 180. The brace mechanism 276 aids in preventing twisting of the trend pivots 274 and the associated linear guide elements 270, 272.

Figure 7:
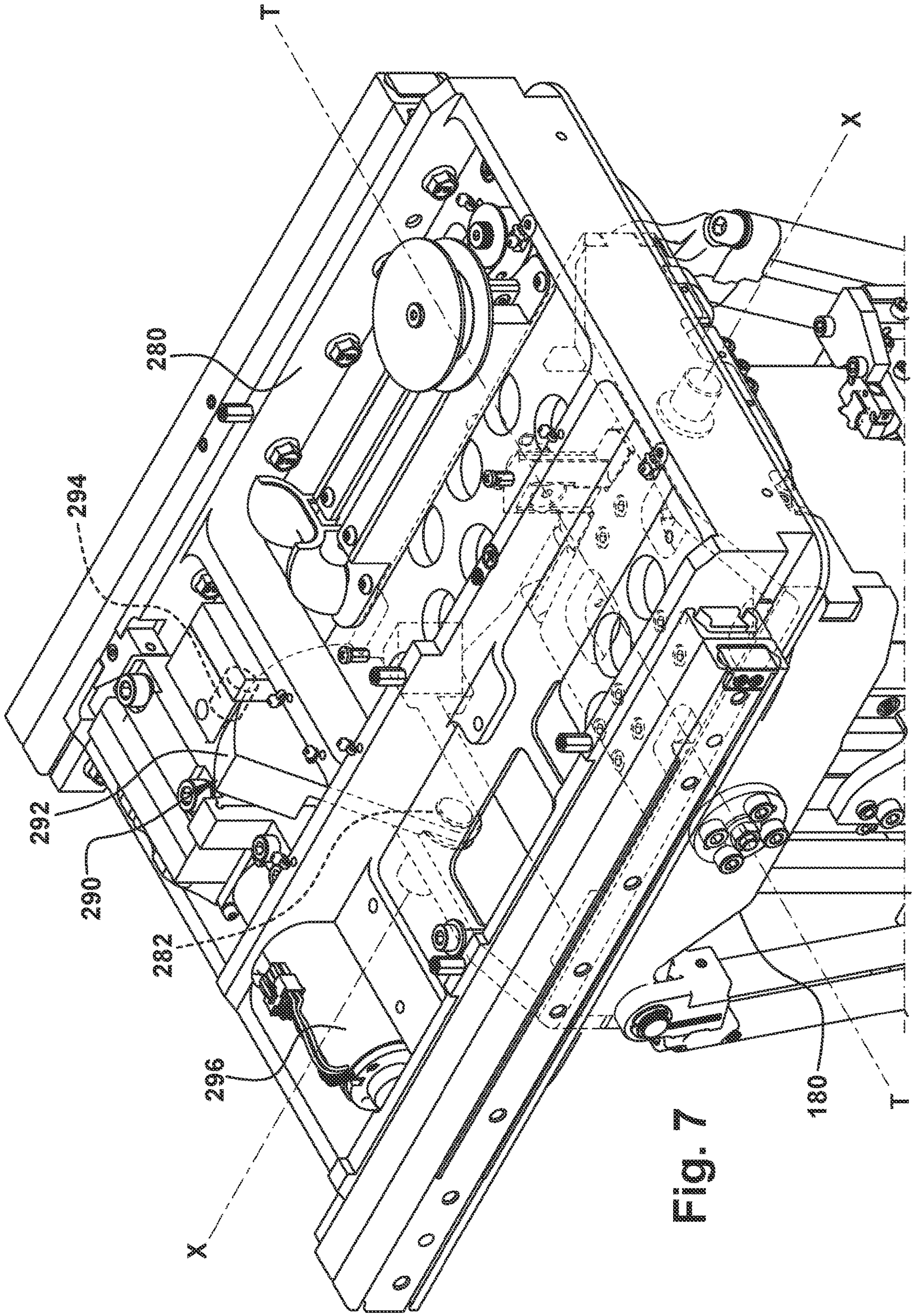
FIG. 7 is a perspective side view from above of a table framework of the FIG. 1 surgical table.
Figure 8:
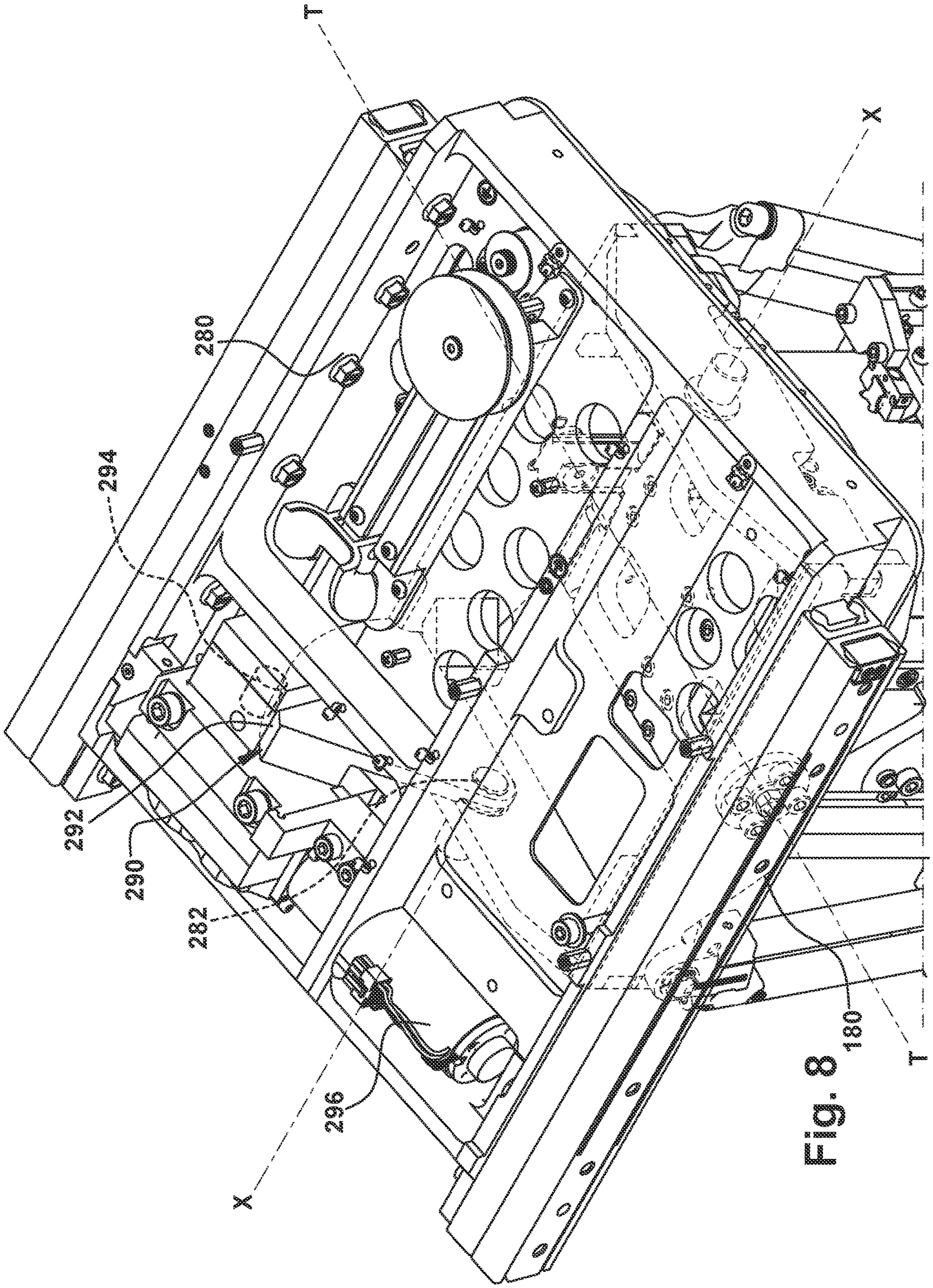
FIG. 8 illustrates a tilt frame rotated about a tilt axis to a first end position relative to a central level position.
Figure 9:
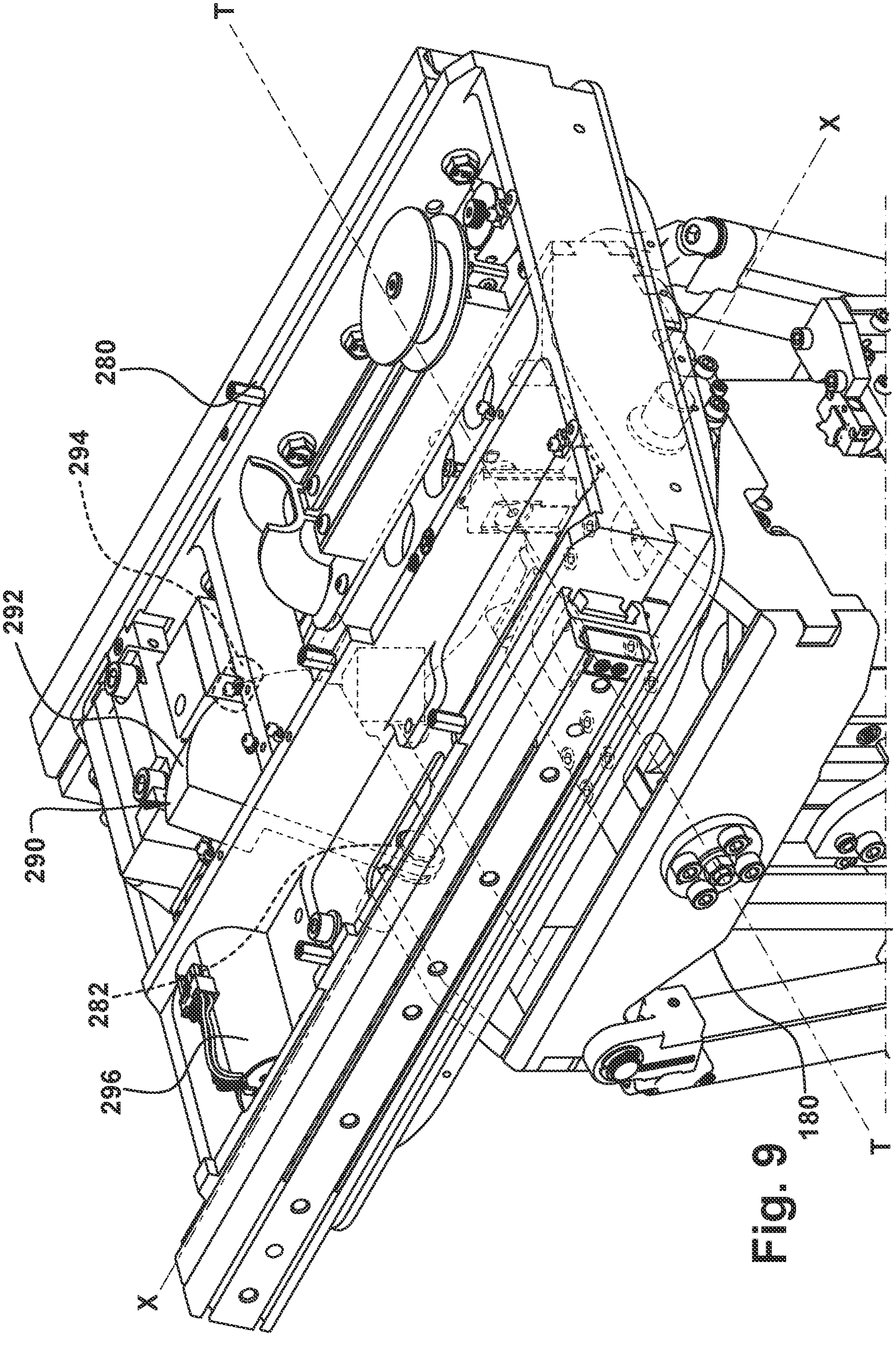
FIG. 9 illustrates the tilt frame rotated about the tilt axis to a second end position, opposite that of the first position of FIG. 8, relative to the central level position.

As shown in FIGS. 7-9, a tilt frame 280 of the surgical table 10 is mounted between the trend frame 180 and the tabletop 40 and is rotatable about the tilt axis X-X, such rotating resulting in moving the tabletop 40 relative to the base 30 in the first and second directions D1, D2. The tabletop 40 may be mounted to the tilt frame 280 in any suitable manner, for example by not shown bolts or screws. In the illustrated surgical table 10, the tilt frame 280 surrounds the trend frame 180, and the tilt axis X-X is above the trend axis T-T. A pivotable connection 282 is oriented along the tilt axis X-X and interconnects the trend frame 180 and the tilt frame 280. An actuator 290 in the form of a rack and pinion mechanism 290 includes a curved rack 292 fitted to the trend frame 180, a rotatable pinion gear 294 fitted to the tilt frame 280, and an electrical drive motor 296 connected to the pinion gear 294 for rotating the pinion gear 294. Rotation of the pinion gear 294, in turn, causes the tilt frame 280 and the tabletop 40 mounted thereto to pivot about the tilt axis X-X, for example, between two opposite end positions relative to a central level position, as shown in FIGS. 8 and 9.

Figure 20:
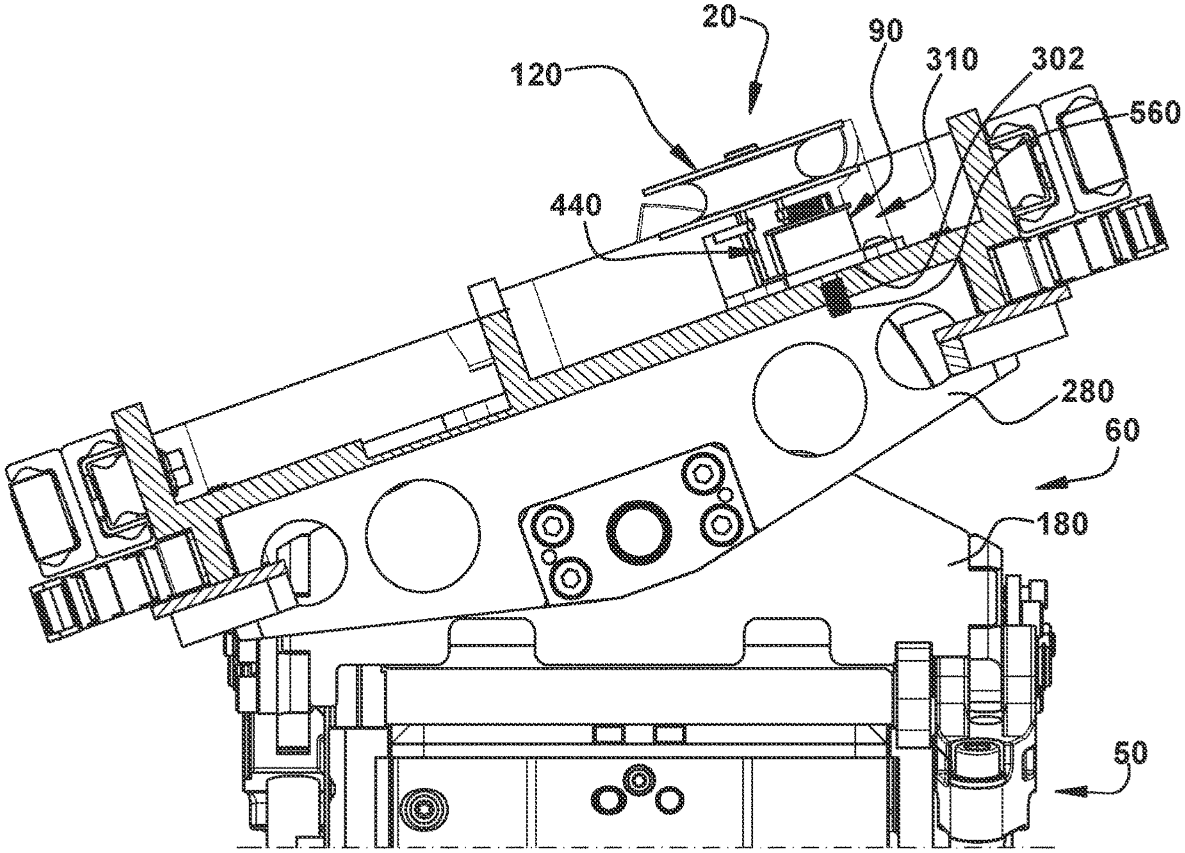
FIG. 20 is a front view of the table framework and the column framework, showing a tilt frame of the table framework tilted counterclockwise about a tilt axis, wherein a view from above looking downward in a direction perpendicular to the table framework results in the sheave being in a position similar to what is shown in FIG. 19.
Figure 21:
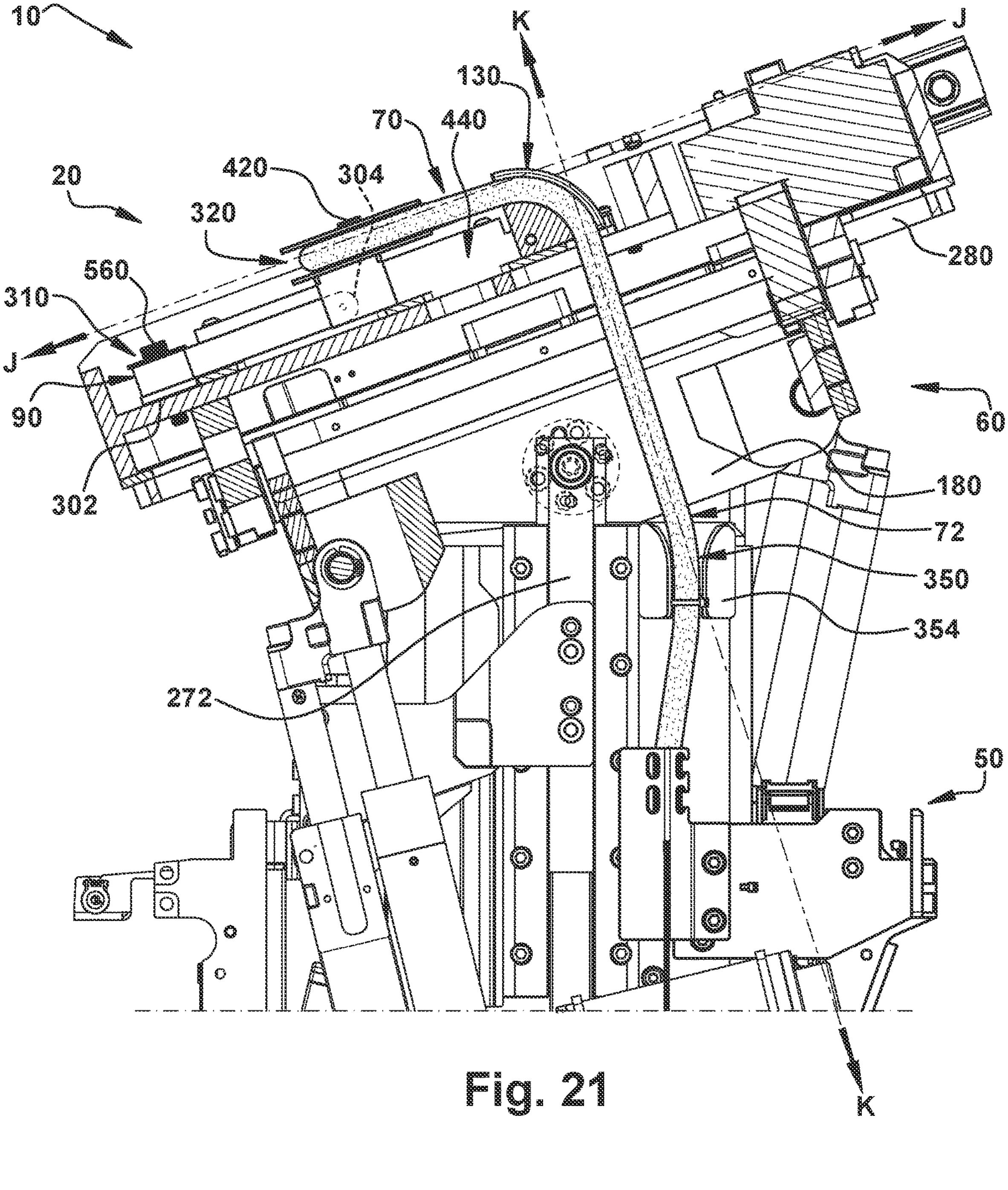
FIG. 21 is an end view of the table framework and the column framework, showing a trend frame of the table framework tilted counterclockwise about a trend axis, wherein a view from above looking downward in a direction perpendicular to the table framework results in the sheave being in a position similar to what is shown in FIG. 19.

As will be appreciated, the tabletop 40 may be moved relative to the base 30 in the first and second directions D1, D2 in any number of ways, for example by vertical displacement by means of the actuator 160 and/or the first and second actuators 172, 174, as shown for example in FIGS. 3, 4 and 14-17, or by rotation about the trend axis T-T by means of the first and second actuators 172, 174, as shown for example in FIG. 21, or by rotation about the tilt axis X-X by means of the actuator 290, for example as shown in FIG. 20, or by a combination of any of the foregoing. Of course, the invention is not limited to the illustrated surgical table 10 and other embodiments are contemplated. Thus, the surgical table 10 may employ other means to realize movement of the tabletop 40 relative to the base 30 in the first and second directions D1, D2, whether a different mechanism for vertically raising and lowering the tabletop 40 relative to the base 30 and/or a different mechanism for rotating the tabletop 40 about a trend axis, and/or a different mechanism for rotating the tabletop 40 about a tilt axis.

Next, a configuration of the cable take-up mechanism 20 in accordance with an embodiment of the invention is described with reference to FIGS. 10-19. In the illustrated surgical table 10, the afore described upper column element 142 forms the column framework 50 and the afore described trend frame 180 and tilt frame 280 form the table framework 60. Other embodiments are contemplated. For example, the intermediate column element 144 or the lower column element 146 may form the column framework 50. In one form, the column framework 50 may be a column without multiple column elements and/or telescoping capabilities.

The table framework 60 may rotate relative to a horizontal axis, either longitudinal or transverse, of the column 140 to move the tabletop 40 relative to the base 30 in the first and second directions D1, D2. In this regard, the surgical table may include a first table framework, for example the trend frame 180, and a second table framework, for example the tilt frame 280, in which case the first and second ends 72, 74 of the cable 70 may be mounted to the respective first and second table frameworks 180, 280, and the constant-force spring 90 may be coupled to the intermediate portion 76 of the cable 70 to take up slack in the cable 70 as the first and second table frameworks 180, 280 move relative to one another to move the tabletop 40 relative to the base 30 in the first and second directions D1, D2.

Further, the table framework 60 may include any type of table supporting framework, whether with trending and/or tilting capabilities, or without trending and/or tilting capabilities. In this regard, the surgical table 10 may include a first column framework, for example the upper column element 142, and a second column framework, for example the lower column element 146, in which case the first and second ends 72, 74 of the cable 70 may be mounted to such respective first and second column frameworks 142, 146, and the constant-force spring 90 may be coupled to the intermediate portion 76 of the cable 70 to take up slack in the cable 70 as the first and second column frameworks 142, 146 move relative to one another to move the tabletop 40 relative to the base 30 in the first and second directions D1, D2.

Figure 10:
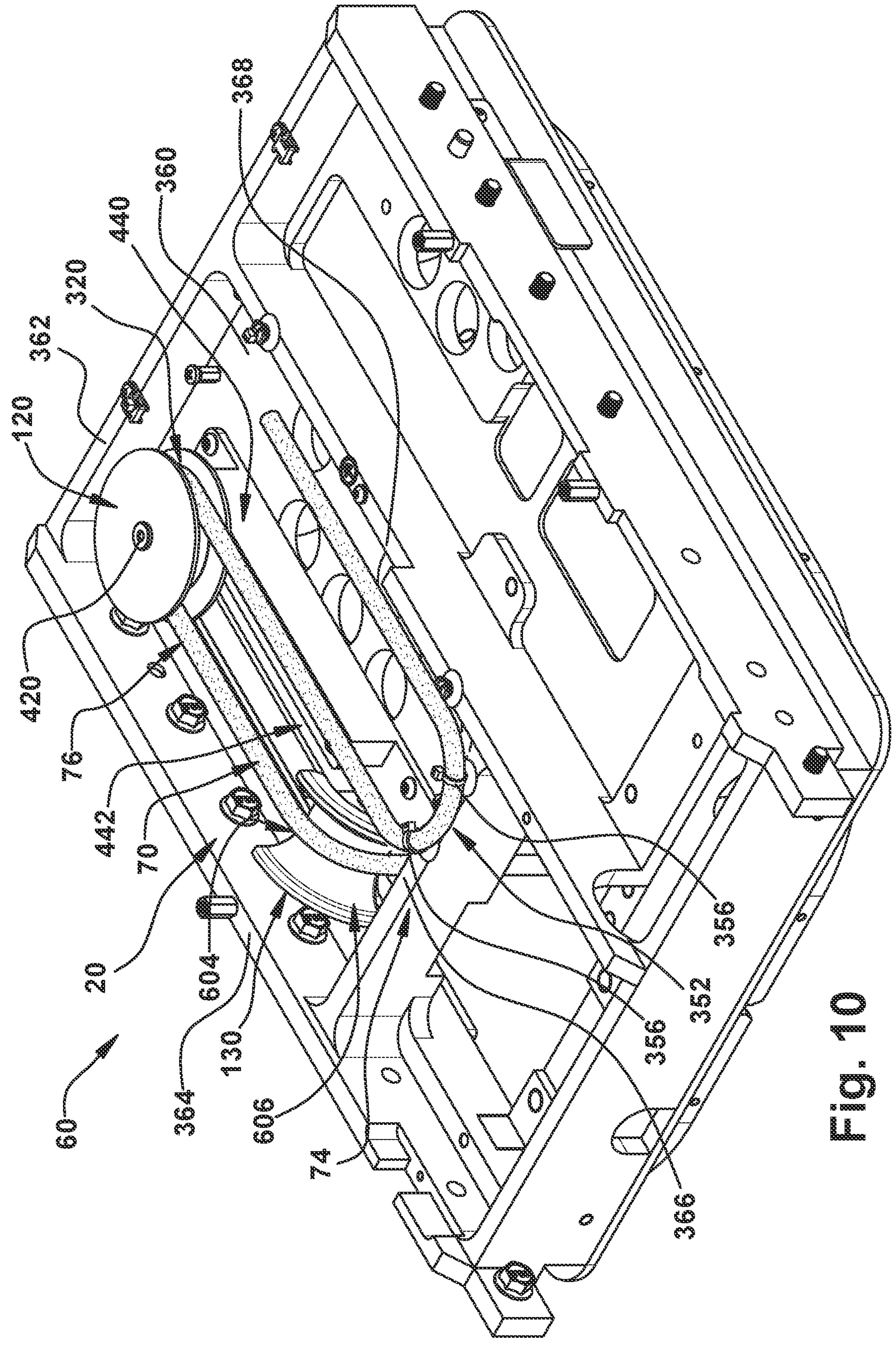
FIG. 10 is a perspective view of a cable take-up mechanism and cable in accordance with an embodiment of the invention, shown mounted to a table framework of the surgical table.
Figure 13:
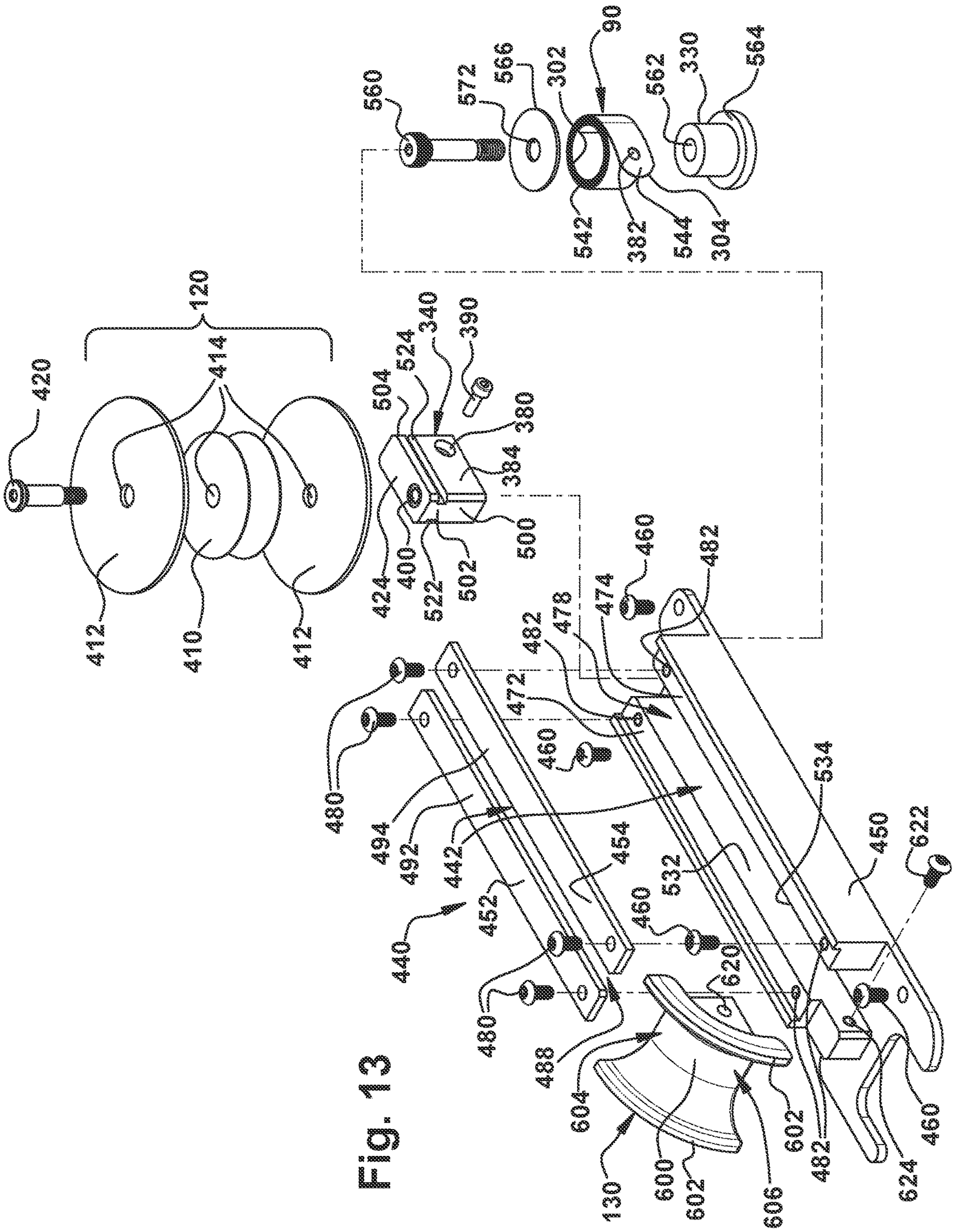
FIG. 13 is an exploded view of the FIG. 10 cable take-up mechanism.

Referring to FIG. 13, the constant-force spring 90 may include a constant-force leaf spring, a constant-force flat spring, a constant-force plate spring, a spiral wound torsion spring, a wound steel strip spring, a fluid dampening spring, a hydraulic spring, an electro-mechanical spring, a computer controlled spring, a computer controlled brake, or any other suitable constant-force spring type that exerts a constant or near constant force over its range of motion. The constant-force spring 90 has a first end portion 302 and a second end portion 304 that is opposite the first end portion 302. The first end portion 302 may be mounted to the table framework 60, for example the tilt frame 280 thereof, to form a coupled spring-second framework connection 310. As shown in FIGS. 13-19 and described in greater detail below, the first end portion 304 may be coupled to the table framework 60 by a spool 330 rotatably mounted to the table framework 60. The second end portion 304 of the constant-force spring 90 may be coupled to the intermediate portion 76 of the cable 70 for movement together as a coupled spring-cable connection 320. As shown in FIG. 10 and described in greater detail below, the second end portion 304 may be coupled to the intermediate portion 76 of the cable 70 directly, or by one or more of the sheave 120 and/or a bearing block 340.

Figure 14:
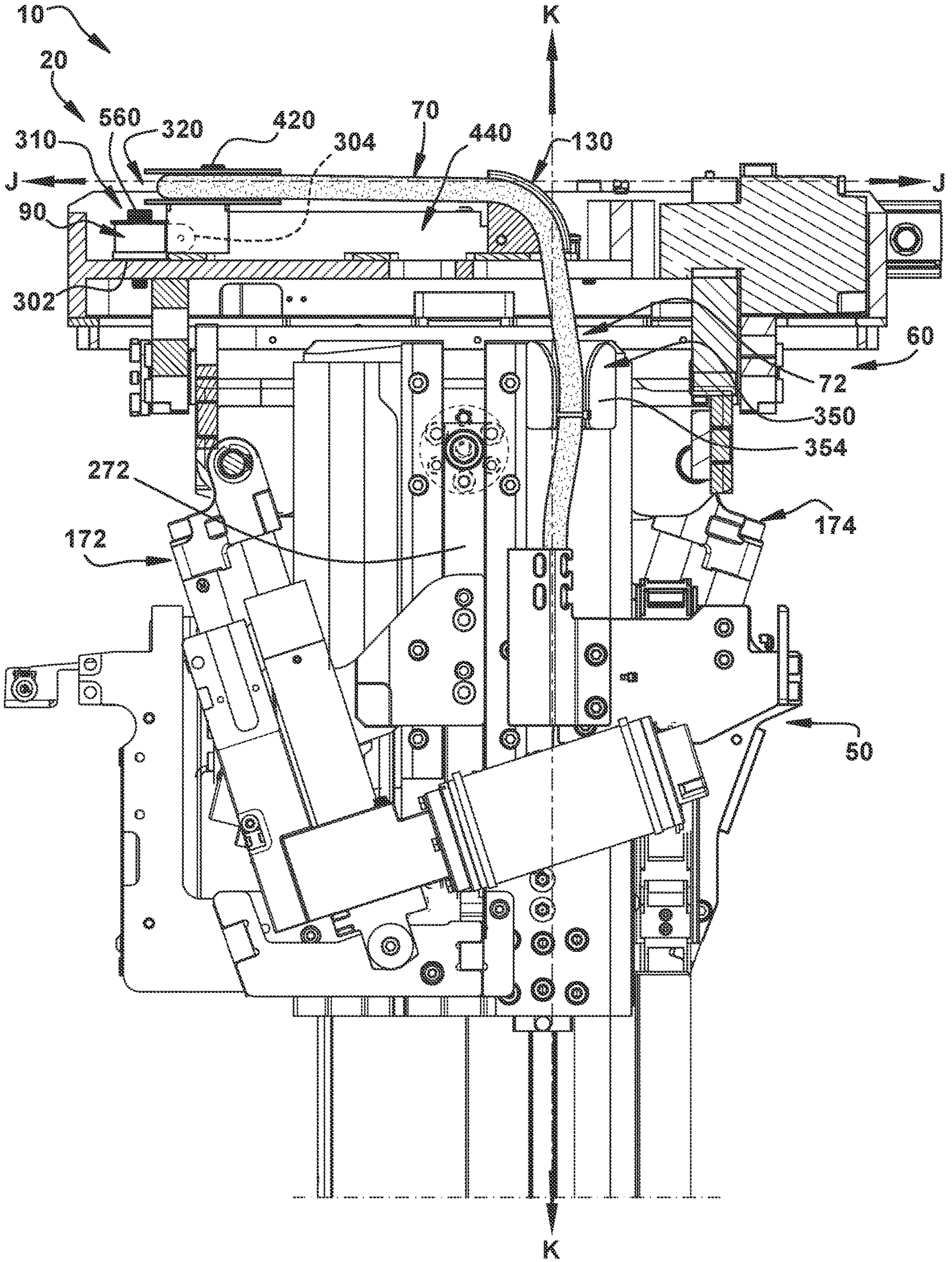
FIG. 14 is a side elevation view of the cable take-up mechanism wherein the table framework on which the cable take-up mechanism is mounted is in a vertically lower position relative to a column framework of the surgical table and the trend frame is shown in phantom to show the cable path more clearly.
Figure 15:
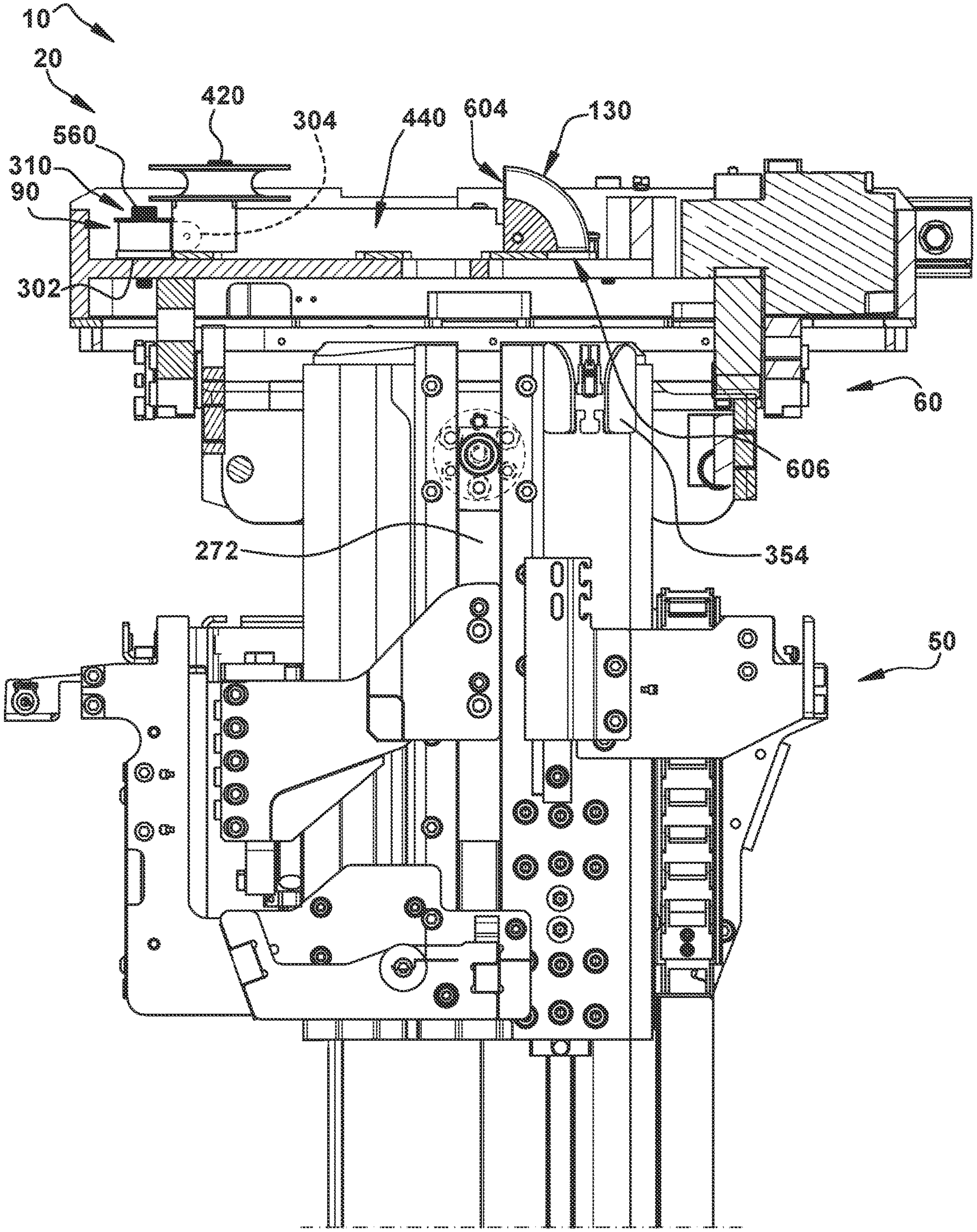
FIG. 15 is the same view as the FIG. 14 view except with the cable and the electrical actuators omitted for clarity.
Figure 16:
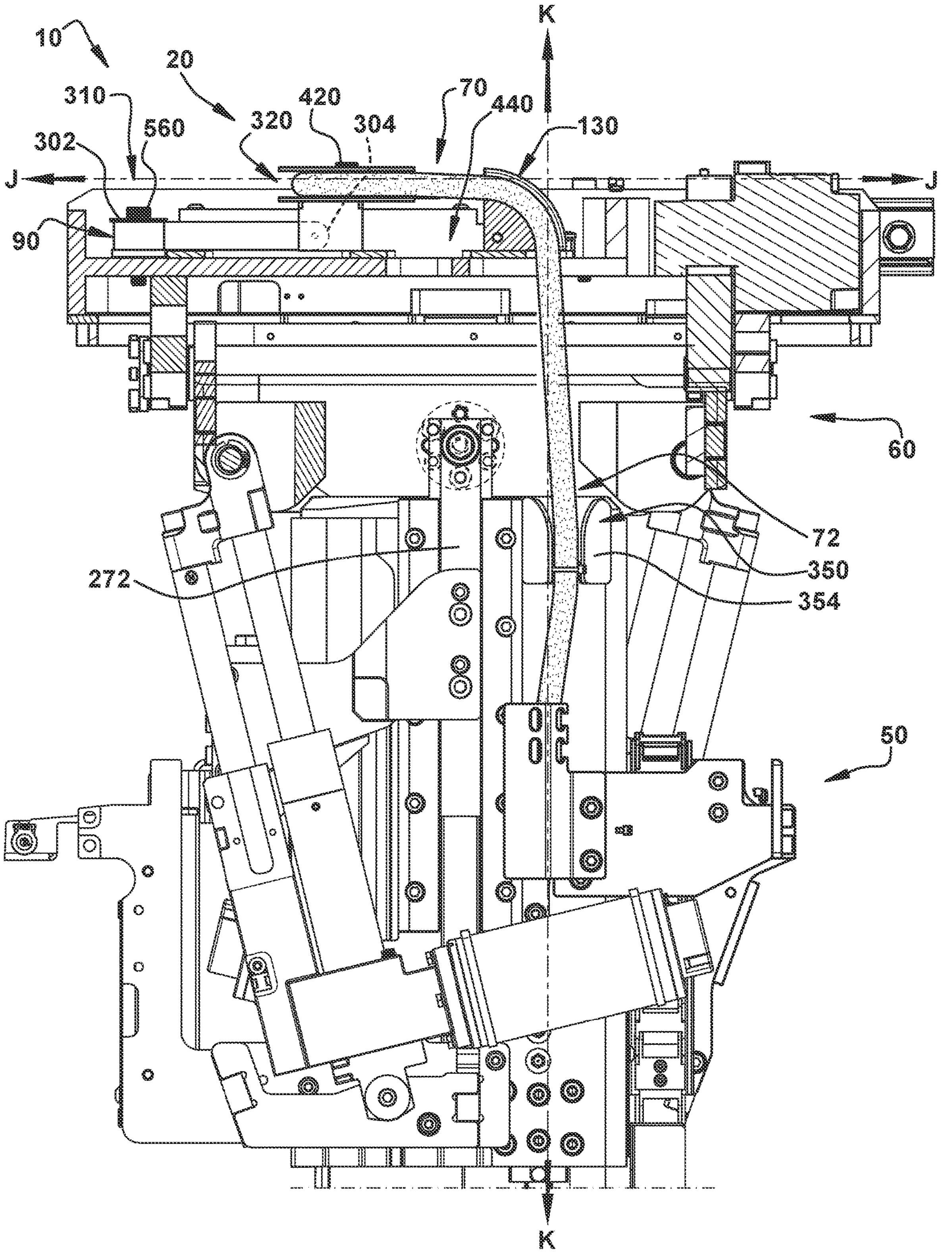
FIG. 16 is a side elevation view of the cable take-up mechanism wherein the table framework on which the cable take-up mechanism is mounted is in a vertically upper position relative to the column framework of the surgical table and the trend frame is shown in phantom to show the cable path more clearly.
Figure 17:
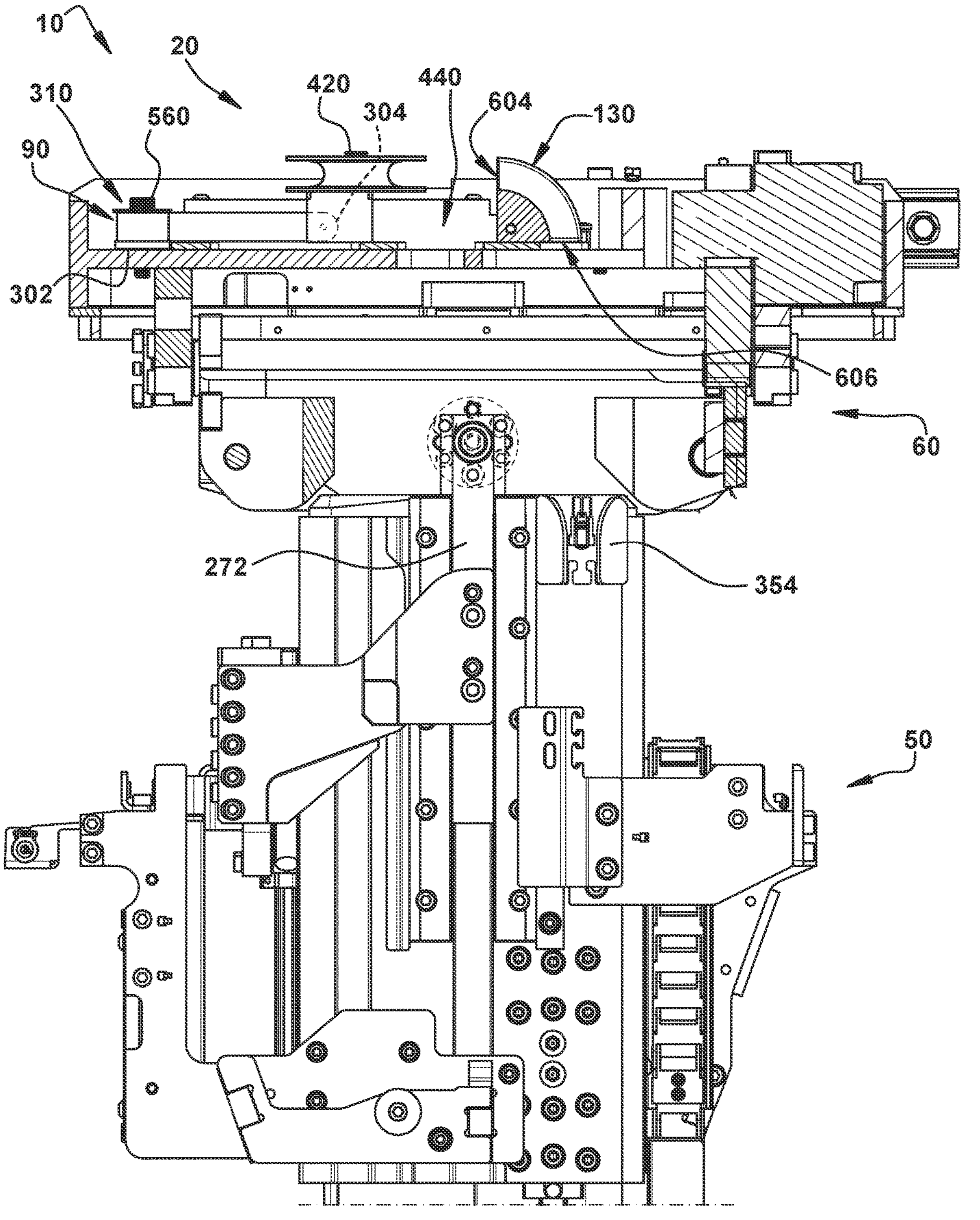
FIG. 17 is the same view as the FIG. 16 view except with the cable and the electrical actuators omitted for clarity.
Figure 18:
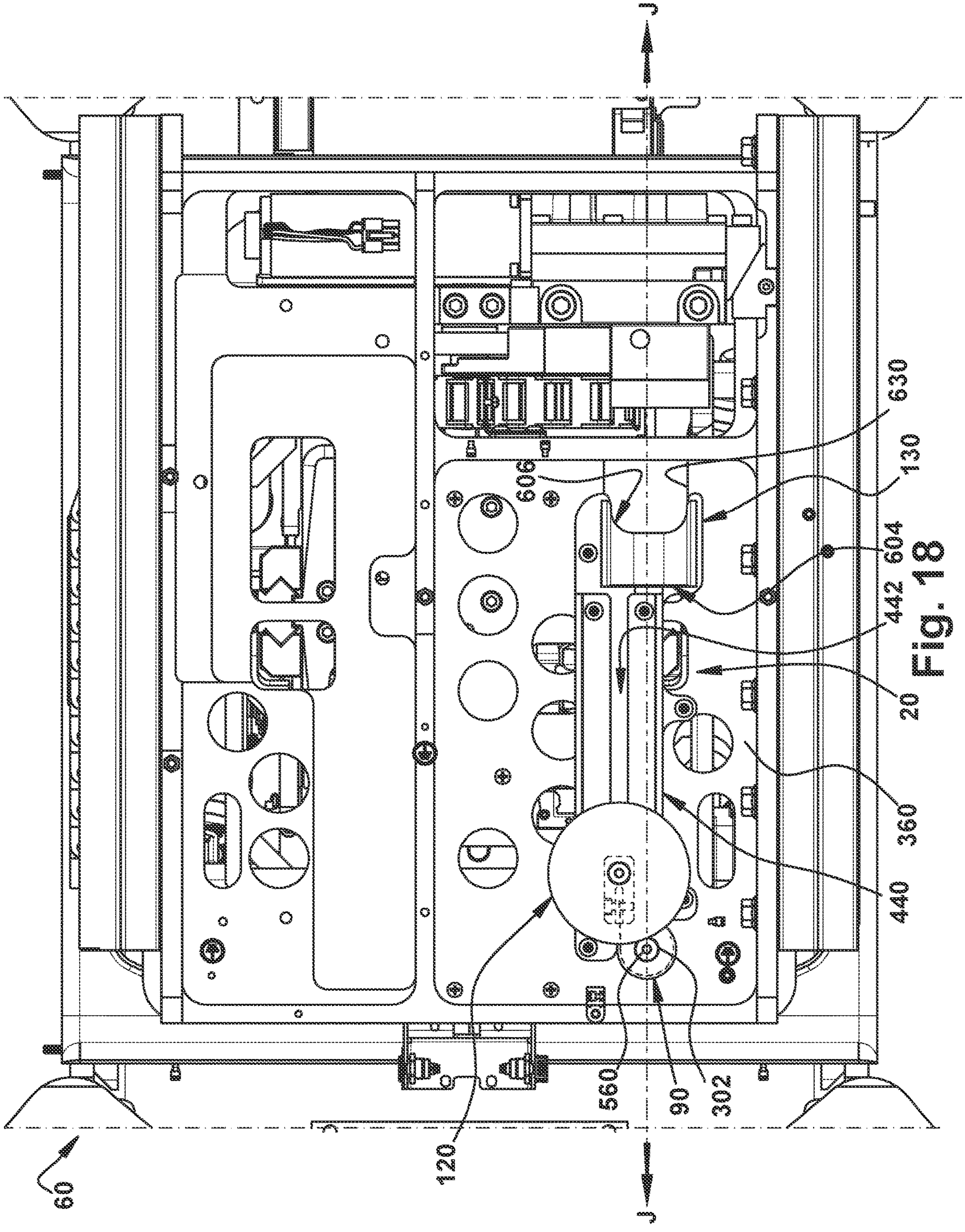
FIG. 18 is a top plan view of the cable take-up mechanism and the table framework, showing a sheave of the cable take-up mechanism in a retracted position corresponding to the FIGS. 14 and 15 vertically lower position of the table framework relative to the column framework, with the cable omitted for clarity.
Figure 19:
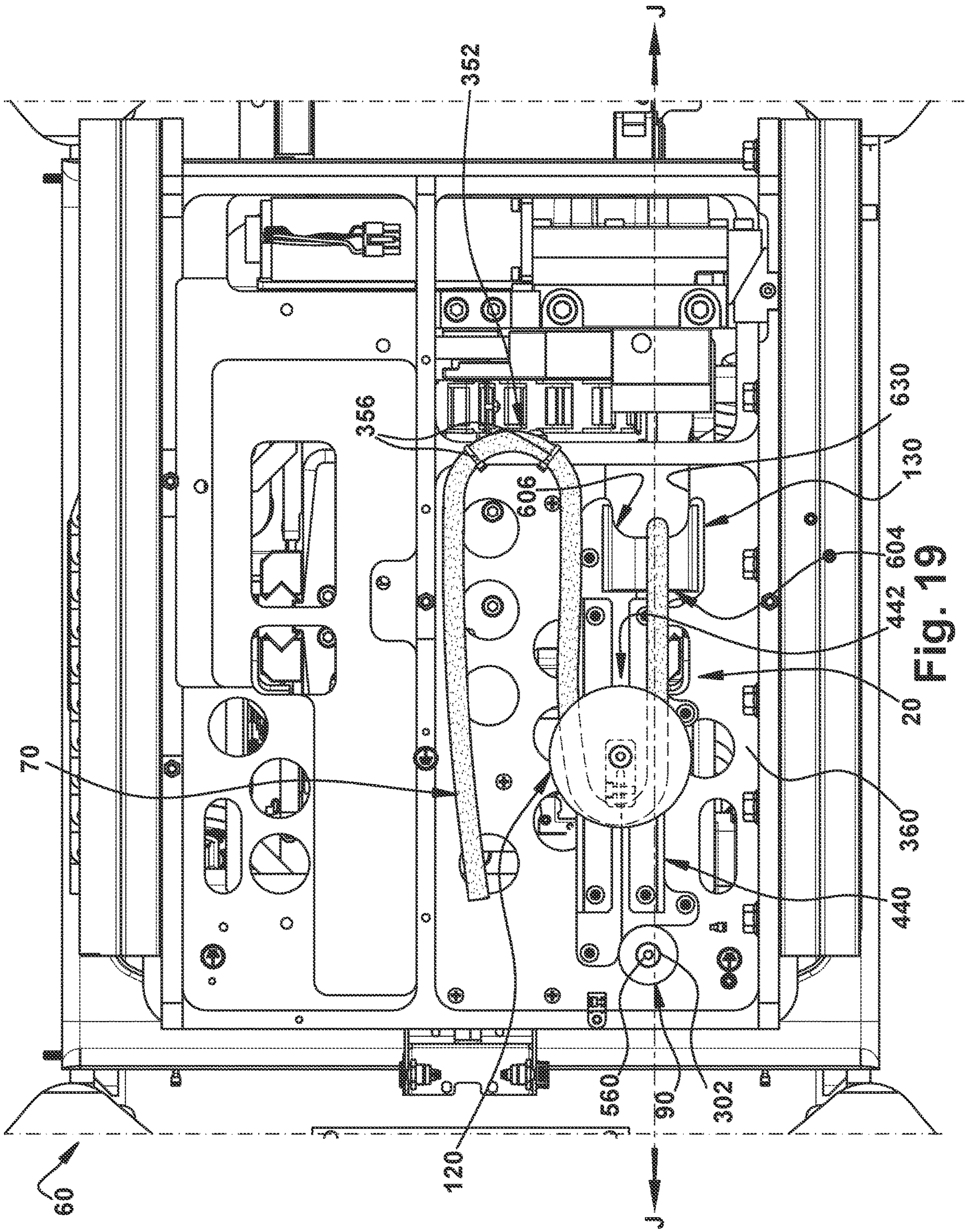
FIG. 19 is a top plan view of the cable take-up mechanism and the table framework, showing the sheave of the cable take-up mechanism in an extended position corresponding to the FIGS. 16 and 17 vertically upper position of the table framework relative to the column framework.

FIGS. 14, 15 and 18 show the first and second actuators 172, 174 having moved the table framework 60 to a vertically lower position relative to the column framework 50, thereby having moved the tabletop 40 relative to the base 30 in the second direction D2, that is downward in FIG. 1. FIGS. 16, 17 and 19 show the first and second actuators 172, 174 having moved the table framework 60 to a vertically upper position relative to the column framework 50, thereby having moved the tabletop 40 relative to the base 30 in the first direction D1, that is upward in FIG. 1. Thus, referring to the movement from the view in FIG. 18 to the view in FIG. 19, as the first and second actuators 172, 174 move the table framework 60 from the vertically lower position to the vertically upper position to move the tabletop 40 relative to the base 30 in the first direction D1, that is upward in FIG. 1, the constant-force spring 90 extends the coupled spring-cable connection 320 relative to the coupled spring-second framework connection 310. Such extending reduces cable slack and/or maintains a constant or near constant tension in the cable 70. Similarly, referring to the movement from the view in FIG. 19 to the view in FIG. 18, as the first and second actuators 172, 174 move the table framework 60 from the vertically upper position to the vertically lower position to move the tabletop 40 relative to the base 30 in the second direction D2, that is downward in FIG. 1, the constant-force spring 90 retracts the coupled spring-cable connection 320 relative to the coupled spring-second framework connection 310. Such retracting reduces cable slack and/or maintains a constant or near constant tension in the cable 70.

Figure 22:
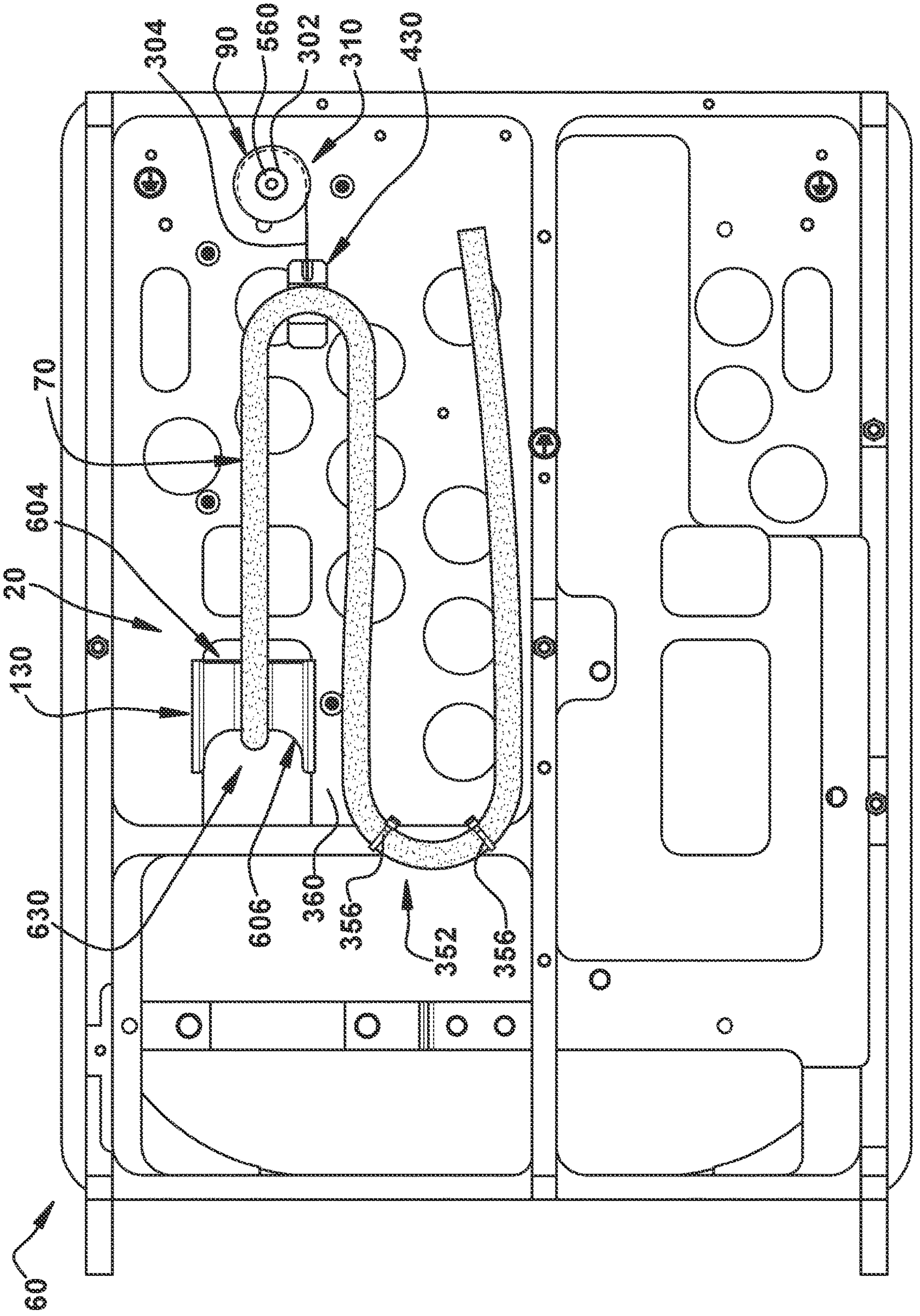
FIG. 22 is a top plan view of a cable take-up mechanism in accordance with another embodiment of the invention.

The first and second ends 72, 74 of the cable 70 may be mounted to the respective column framework 50 and table framework 60 at, respectively, a cable-first framework connection 350 and a cable-second framework connection 352. As shown in FIGS. 14, 16 and 21, the first end 72 may be connected to the upper column element 142 by a bracket 354 attached to the upper column element 142 by not shown bolts or screws, thus forming the cable-first framework connection 350. As described above, the tabletop 40 is mounted to the tilt frame 280 of the table framework 60. The tabletop 40 together with the table framework 60 mounted thereto is moveable relative to the cable-first framework connection 350 as the column framework 50 and the table framework 60 move relative to one another to move the tabletop 40 relative to the base 30 in the first and second directions D1, D2. As shown in FIGS. 10, 19 and 22, the second end 74 of the cable 70 may be connected to the table framework 60 by a bracket or zip tie 356 attached to the table framework 60, thus forming the cable-second framework connection 352.

Figure 11:
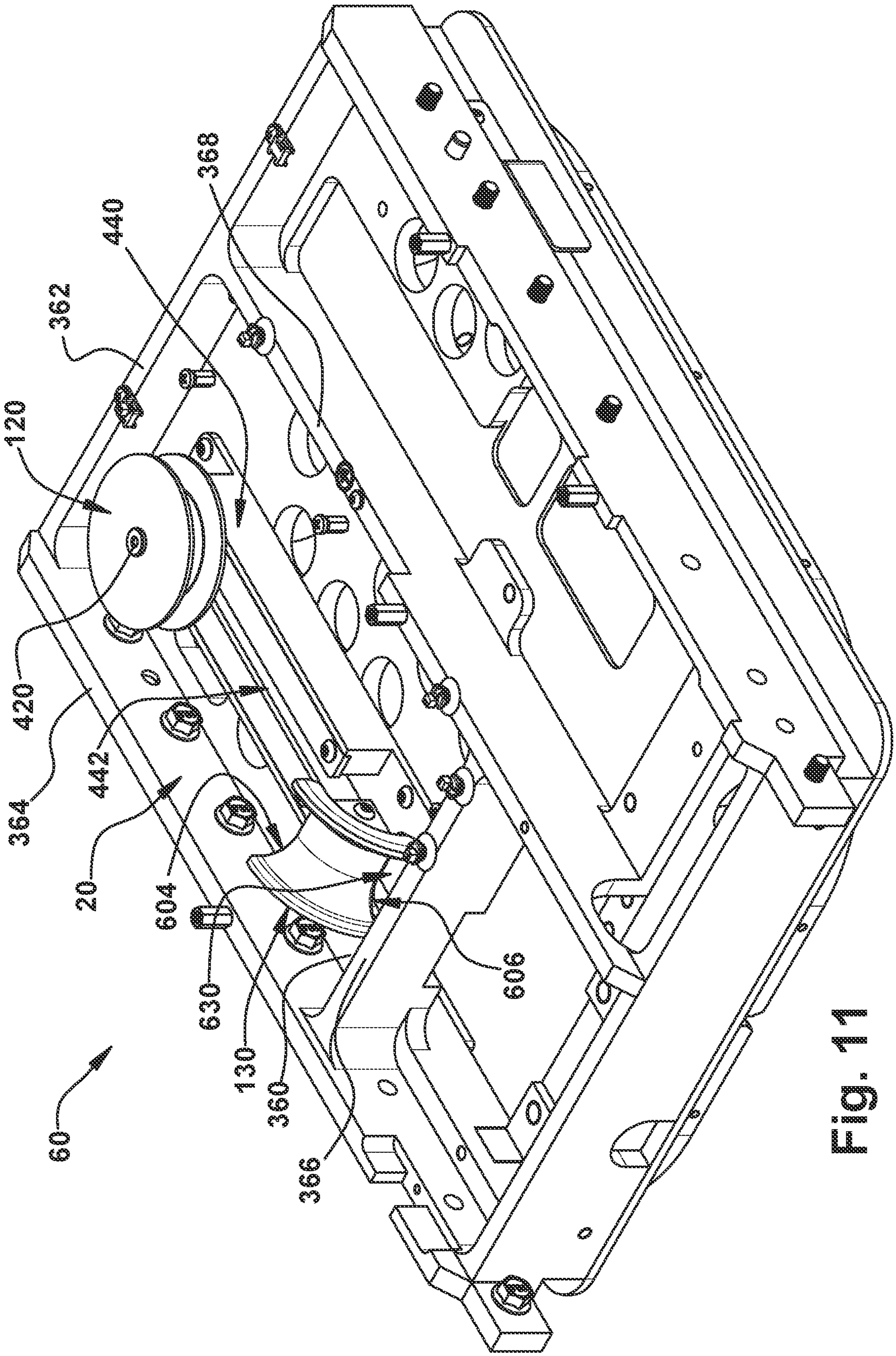
FIG. 11 is the same view as the FIG. 10 view except with the cable omitted for clarity.
Figure 12:
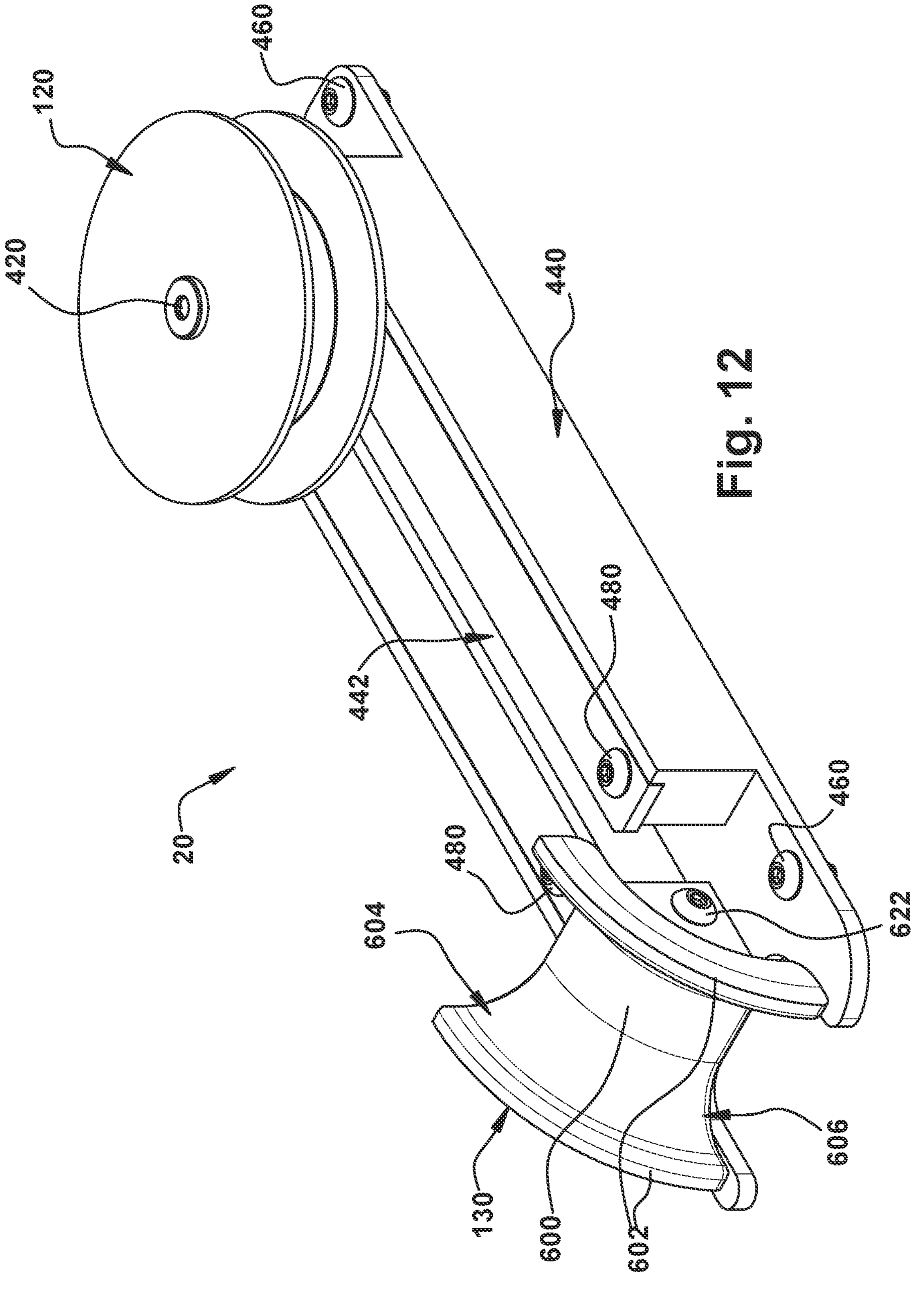
FIG. 12 is an enlarged view of the FIG. 10 cable take-up mechanism.

Referring now to FIGS. 1, 10 and 11, the cable take-up mechanism 20 is arranged within a space or volume bound at its bottom by a lower wall 360 of the table framework 60, at its sides by four upright walls 362, 364, 366, 368 of the table framework 60, and at its top by the structure of the tabletop 40 that is mounted on the table framework 60, as shown in FIG. 1. As such, the coupled spring-cable connection 320 of the cable take-up mechanism 20 is arranged for movement within the outermost dimensions of the tabletop 40 and the table framework 60 as the tabletop 40 moves relative to the base 30 in the first and second directions D1, D2. In some embodiments, the cable take-up mechanism 20 may be arranged entirely within the outermost dimensions of the table framework 60, for example where sufficient depth is provided by the upright walls 362, 364, 366, 368, or arranged entirely within the outermost dimensions of the tabletop 40, for example where sufficient depth is provided within the structure of the tabletop 40. As will be appreciated, the relatively small volumetric footprint of the cable take-up mechanism enables the cable take-up mechanism 20 to be arranged in spaces or volumes of the surgical table 10 that heretofore could not accommodate a cable take-up mechanism, for example, a hydraulic cylinder powered take-up mechanism.

In some embodiments, the coupled spring-cable connection 320 may be arranged for movement not only within the outermost dimensions of the tabletop 40 and the table framework 60 but also arranged for movement within the space below the table framework 60, for example alongside the column 140, particularly where the coupled spring-cable connection 320 may be configured to bend around the curved guide segment 130 to below the table framework 60.

In the illustrated cable take-up mechanism 20, the second end portion 304 of the constant-force spring 90 is coupled to the intermediate portion 76 of the cable 70 to form the coupled spring-cable connection 320 by means of the afore mentioned sheave 120. In FIG. 13, the sheave 120 is rotatably coupled to the second end portion 304 by the bearing block 340. Following, then, is a description of an exemplary configuration of the coupling including the sheave 120, the bearing block 340, and the second end portion 304 of the constant-force spring 90, in accordance with an embodiment of the invention.

The bearing block 340 includes a horizontal threaded hole 380. The distal end of the second end portion 304 of the constant-force spring 90 includes a corresponding through hole 382. The distal end of the second end portion 304 is abutted against a side wall 384 of the bearing block 340 to align the through hole 382 with the horizontal threaded hole 380 in the bearing block 340. A threaded bolt 390 may then be threaded into the threaded hole 380 to connect the second end portion 304 of the constant-force spring 90 to the bearing block 340. The bearing block 340 also includes a vertical threaded hole 400. The vertical threaded hole 400 is offset from the horizontal threaded hole 380 so as not to overlap one another. The sheave 120 includes a hub 410 and a pair of side walls 412 on opposite sides of the hub 410. The hub 410 and side walls 412 have central openings that together form a corresponding bore 414 in the sheave 120 when the hub 410 and side walls 412 are assembled in side-by-side fashion. The bore 414 of the sheave 120 has a diameter that is slightly larger than the diameter of the shank, or shoulder, of a shoulder bolt 420 to be passed therethrough. The sheave 120 is abutted against a top wall 424 of the bearing block 340 to align the bore 414 with the vertical threaded hole 400. The shoulder bolt 420 may then be passed through the bore 414 and threaded into the vertical threaded hole 400 to rotatably connect the sheave 120 to the bearing block 340.

As shown in FIG. 10, the intermediate portion 76 of the cable 70 may be slidably wrapped around the sheave 120. As the constant-force spring 90, with the bearing block 340 connected to the second end portion 304 thereof, extends and retracts to take up slack and maintain a constant or near constant tension in the cable 70, the intermediate portion 76 of the cable 70 slidably wraps around the sheave 120, entering one side thereof and exiting another side thereof, in the illustrated embodiment wrapping around the sheave 120 approximately 180 degrees. Thus, the constant-force spring 90 may be configured to extend the sheave 120 relative to the coupled spring-second framework connection 310 as the tabletop 40 moves in the first direction D1 relative to the base 30, as shown for example in FIG. 16. Such extending reduces cable slack and/or maintains a constant or near constant tension in the cable 70. Further the constant-force spring 90 may be configured to retract the sheave 120 relative to the coupled spring-second framework connection 310 as the tabletop 40 moves in the second direction D2 relative to the base 30, as shown for example in FIG. 14. Such retracting reduces cable slack and/or maintains a constant or near constant tension in the cable 70. The cable 70 may slidably wrap around the sheave 120 either by slippage between the surface of the cable 70 and the surface of the sheave 120, or by the bore 414 slidably bearing against the shoulder bolt 420, or by a combination of the foregoing. Also, the cable 70 may wrap around the sheave 120 in other angular amounts, for example 90 degrees or anywhere in the range of five (5) to 180 degrees.

As will be appreciated, by wrapping the cable 70 around the sheave 120 about 180 degrees the sheave 120 enables twice as much variation in cable length. Thus, the cable take-up mechanism 20 by means of the sheave 120 can take up two times as much slack in the cable 70 than if no sheave 120 was used, which translates into larger movements of the tabletop 40 relative to the base 30 in the first and second directions D1, D2. This is illustrated by a comparison of FIG. 16 and FIG. 14. In FIG. 16, the tabletop 40 has been moved vertically upward relative to the base 30, resulting in the length of the cable 70 between the cable-first framework connection 350 and the tabletop 40 being about 20 inches. In FIG. 14, the tabletop has been moved vertically downward relative to the base 30, resulting in the length of the cable 70 between the cable-first framework connection 350 and the tabletop 40 being about 10 inches. Thus, the cable take-up mechanism 20 takes up about ten (10) inches of slack in the cable 70 as the tabletop 40 is moved relative to the base 30 from the position shown in FIG. 16 to the position shown in FIG. 14. However, as shown in the upper portions of FIGS. 14 and 16, the length of travel of the sheave 120 and the second end portion 304 of the constant-force spring 90 to which the sheave 120 is rotatably mounted, is only about five (5) inches, that is, half the length of cable 70 taken up by the constant-force spring 90.

In some embodiments, the length of cable 70 required to be taken up by the cable take-up mechanism 20 may not require such two-to-one take-up ratio. For example, the amount of wrap around the sheave 120 may be less than 180 degrees, in which case the corresponding ratio of length of slack taken up relative to length of movement of the sheave 120 will be less than two-to-one.

In other embodiments, the sheave 120 may be omitted, in which case the intermediate portion 76 of the cable 70 may be coupled by other means to the second end portion 304 of the constant-force spring 90 to form the coupled spring-cable connection 320. For example, the intermediate portion 76 of the cable 70 may be directly connected to the second end portion 304, as shown for example in FIG. 22. In one form, the intermediate portion 76 of the cable 70 may be passed through the through hole 382 in the distal end of the second end portion 304 of the constant-force spring 90 in such a manner that the intermediate portion 76 and the distal end move together as a unit. The through hole 382, or any other part of the distal end of the second end portion 304, may be configured to accommodate a gripping sleeve 430 that grips the cable 70 as shown in FIG. 22 for such purpose. In another form, the bearing block 340 may be configured to accommodate a bracket that secures the intermediate portion 76 to the bearing block 340 in such a manner that the intermediate portion 76, the bracket, the bearing block 340 and the distal end of the second end portion 304 move together as a unit.

Referring again to FIGS. 1, 10 and 11, the cable take-up mechanism 20 including the sheave 120 may be arranged within a space or volume bound at its bottom by the lower wall 360, at its sides by the four upright walls 362, 364, 366, 368, and at its top by the structure of the tabletop 40. As such, the sheave 120 of the cable take-up mechanism 20 is arranged for movement within the outermost dimensions of the tabletop 40 and the table framework 60 as the tabletop 40 moves relative to the base 30 in the first and second directions D1, D2. The relatively small volumetric footprint of the cable take-up mechanism 20, even including the sheave 120, enables the cable take-up mechanism 20 to be arranged in spaces or volumes of the surgical table 10 that heretofore could not accommodate a cable take-up mechanism, for example, a hydraulic cylinder powered take-up mechanism.

As shown in FIGS. 10-13 and 18-20, the illustrated cable take-up mechanism may include a channeled frame 440 mounted to the table framework 60. The channeled frame 440 constrains the bearing block 340, and thus the constant-force spring 90 mounted thereto, to sliding linear movement via a linear channel 442 of the channeled frame 440. As previously described, the second end portion 304 of the constant-force spring 90 may be coupled to the intermediate portion 76 of the cable 70 by the bearing block 340 to form the coupled spring-cable connection 320, whether by the intermediate portion 76 wrapping around the sheave 120 rotatably coupled to the bearing block 340 or by a bracket that secures the intermediate portion 76 to the bearing block 340 in such a manner that the intermediate portion 76, the bracket, the bearing block 340 and the distal end of the second end portion 304 move together as a unit. Thus, the constant-force spring 90 may be configured to extend the bearing block 340 and the coupled spring-cable connection 320 relative to the coupled spring-second framework connection 310 as the tabletop 40 moves in the first direction D1 relative to the base 30, as shown for example in FIG. 16. Such extending reduces cable slack and/or maintains a constant or near constant tension in the cable 70. Further, the constant-force spring 90 may be configured to retract the bearing block 340 and the coupled spring-cable connection 320 relative to the coupled spring-second framework connection 310 as the tabletop moves in the second direction D2 relative to the base 30, as shown for example in FIG. 14. Such retracting reduces cable slack and/or maintains a constant or near constant tension in the cable 70.

FIG. 13 shows a configuration of the channeled frame 440 in accordance with an embodiment of the invention. The channeled frame 440 includes a base 450 and a pair of guide plates 452, 454. The base 450 is mounted to the table framework 60, for example by screws 460 threaded into not shown threaded openings in the lower wall 360 of the table framework 60. The base 450 has two upright walls 472, 474 that are oriented parallel to one another to define a lower linear slot or guideway 478 therebetween. The guide plates 452, 454 are mounted to the upper surfaces of the respective upright walls 472, 474, for example by screws 480 threaded into corresponding threaded openings 482 in the upright walls 472, 474. The guide plates 452, 454 are oriented parallel to one another to define an upper linear slot or guideway 488 therebetween. The inner portions of the guide plates 452, 454 form a pair of parallel tracks 492, 494. The upper guideway 488 is less in width than the lower guideway 478. The lower guideway 478 and the upper guideway 488 together provide the linear channel 442 that slidably receives the bearing block 340.

The bearing block 340 has a lower bearing portion 500, a middle bearing portion 502, and an upper bearing portion 504. The upper and lower bearing portions 502, 504 are greater in width than the middle bearing portion 502 to define a pair of grooves 522, 524 in opposite sides of the bearing block 340. The grooves 522, 524 of the bearing block 340 slidably engage the respective tracks 492, 494 of the channeled frame 440. Additionally, the lower bearing portion 504 with the second end portion 304 of the constant-force spring 90 mounted thereto may be slightly less in width than the lower guideway 478 of the channeled frame 440 such that the lower bearing portion 504 with the second end portion 304 mounted thereto slidably abuts inward facing surfaces 532, 534 of the upright walls 472, 474 that form the lower guideway 478.

The channeled frame 440 ensures that the bearing block 340 and thus the coupled spring-cable connection 320 moves along a linear path and does not shift or sag within the table framework 60 and/or the tabletop 40 during raising and lowering and/or tilting and/or trending of the tabletop 40. Thus, as the constant-force spring 90 takes up slack in the cable 70 as the table framework 60 and the column framework 50 move relative to one another to move the tabletop 40 relative to the base 30 in the first and second directions D1, D2, the bearing block 340 slidably engages the linear channel 442 along the linear path. In the illustrated embodiment, the linear channel 442 of the channeled frame 440 linearly guides movement of the bearing block 340 and thus the second end portion 304 of the constant-force spring 90 mounted thereto along a translation axis that is parallel to the longitudinal direction of the tabletop 40. It will be appreciated that in some embodiments the channeled frame 440 may be oriented such that the linear channel 442 linearly guides the bearing block 340 along a translation axis that is parallel to the transverse direction of the tabletop 40, or along a translation axis that is at an oblique angle relative to the longitudinal direction and transverse direction.

Referring again to FIGS. 1, 10 and 11, the cable take-up mechanism 20 including the bearing block 340 may be arranged within a space or volume bound at its bottom by the lower wall 360, at its sides by the four upright walls 362, 364, 366, 368, and at its top by the structure of the tabletop 40. As such, the bearing block 340 of the cable take-up mechanism 20 is arranged for movement within the outermost dimensions of the tabletop 40 and the table framework 60 as the tabletop moves relative to the base 30 in the first and second directions D1, D2. The relatively small volumetric footprint of the cable take-up mechanism 20, even including the bearing block 340, enables the cable take-up mechanism 20 to be arranged in spaces or volumes of the surgical table 10 that heretofore could not accommodate a cable take-up mechanism, for example, a hydraulic cylinder powered take-up mechanism.

In embodiments where a sheave 120 is rotatably mounted to the bearing block 340, as shown in FIGS. 1, 10 and 11, the cable take-up mechanism 20 including the bearing block 340 and sheave 120 rotatably mounted thereto may be arranged within a space or volume bound at its bottom by the lower wall 360, at its sides by the four upright walls 362, 364, 366, 368, and at its top by the structure of the tabletop 40. As such, the bearing block 340 with the sheave 120 rotatably mounted thereto is arranged for movement within the outermost dimensions of the tabletop 40 and the table framework 60 as the tabletop 40 moves relative to the base 30 in the first and second directions D1, D2. Here too, the relatively small volumetric footprint of the cable take-up mechanism 20, even including the bearing block 340 and the sheave 120 rotatably mounted thereto, enables the cable take-up mechanism 20 to be arranged in spaces or volumes of the surgical table 10 that heretofore could not accommodate a cable take-up mechanism, for example, a hydraulic cylinder powered take-up mechanism.

Referring again to FIG. 13, a configuration of the coupled spring-second framework connection 310 will now be described. As previously described, the first end portion 302 of the constant-force spring 90 may be coupled to the table framework 60 to form the coupled spring-second framework connection 310. In the illustrated embodiment, the first end portion 302 of the constant-force spring 90 may include a coil portion 542 and the second end portion 304 of the constant-force spring 90 may include a free end 544. The coil portion 542 may be fitted on the afore mentioned spool 330 which, in turn, may be rotatably mounted to the table framework 60 to form the coupled spring-second framework connection 310. The free end 544 may be coupled to the intermediate portion 76 of the cable 70 by any of the afore described means, that is directly or by one or more of the sheave 120 and/or the bearing block 340, for movement of the free end 544 and the intermediate portion 76 together as the coupled spring-cable connection 320.

The spool 330 may be rotatably mounted to the table framework 60 by a shoulder bolt 560. As shown in FIG. 13, the bore 562 of the spool 330 has a diameter that is slightly larger than the diameter of the shank, or shoulder, of the shoulder bolt 560 to be passed therethrough. The coil portion 542, once installed on the spool 330, is flanked on one side by a lower circumferential flange 564 of the spool 330 and on the opposite side by a washer 566. The washer 566 has a through hole 572 that has a diameter slightly larger than the diameter of the shank, or shoulder, of the shoulder bolt 560 to be passed therethrough. The spool 330, the coil portion 542, and the washer 566 are stacked, in that order, and the shoulder bolt 560 is passed through the through hole 572 of the washer 566 and the bore 562 of the spool 330 and threaded into a not shown threaded opening in the lower wall 360 of the table framework 60 thereby rotatably mounting the spool 330 to the table framework 60.

FIGS. 14 and 16 show an example of the constant-force spring 90 and particularly the coil portion 542 thereof in operation. As shown in FIG. 16, as the tabletop 40 moves in the first direction D1 relative to the base 30 the coil portion 542 uncoils, that is unwinds, to extend the coupled spring-cable connection 320 relative to the coupled spring-second framework connection 310. Such extending reduces cable slack and/or maintains a constant or near constant tension in the cable 70. As shown in FIG. 14, as the tabletop 40 moves in the second direction D2 relative to the base 30, the coil portion 542 coils, that is winds up, to retract the coupled spring-cable connection 320 relative to the coupled spring-second framework connection 310. Such retracting reduces cable slack and/or maintains a constant or near constant tension in the cable 70.

In the illustrated embodiment, the first end portion 302 of the constant-force spring 90 is in the form of the coil portion 542, which is coupled to the table framework 60 to form the coupled spring-second framework connection 310, and the second end portion 304 of the constant-force spring 90 is in the form of the free end 544, which is coupled to the intermediate portion 76 of the cable 70 for movement together as a coupled spring-cable connection 320. Other embodiments are contemplated. For example, the coil and free end relationship may be switched. Thus, in some embodiments, the first end portion 302 of the constant-force spring 90 may be in the form of a free end that is coupled to the table framework 60 to form the coupled spring-second framework connection 310, and the second end portion 304 of the constant-force spring 90 may be in the form of a coil spring that is coupled to the intermediate portion 76 of the cable 70 for movement together as a coupled spring-cable connection 320.

Referring now to FIGS. 10-19 and 21-24, the curved guide segment 130 in accordance with an embodiment of the invention will now be described. As will be appreciated, in some embodiments, the surgical table 10 may be configured without the curved guide segment 130, for example where no change in a cable travel path direction of the cable 70 is required or a change in the travel path direction of the cable 70 is accomplished by other means.

As shown in FIG. 13, the curved guide segment 130 may take the form of a quarter round or 90 degrees arc structure. The curved guide segment includes a 90 degree hub 600 and a pair of 90 degree rims or flanges 602 extending radially outward from the hub 600 on axially opposite sides of the hub 600. The hub 600 and flanges 602 form first and second U-shape openings 604, 606 at opposite ends of the arc, as shown for example in FIGS. 18, 19 and 22-24. As shown in FIG. 19, the first and second U-shape openings 604, 606 of the curved guide segment 130 may be sized to receive the cable 70 therethrough with a tolerance of approximately one-half cable diameter on opposite sides of the cable 70. This allows the cable 70 to shift laterally as the cable 70 bends around the curved guide segment 130.

The hub 600 includes an axial through hole 620 for receiving a screw 622 therethrough. A corresponding threaded hole 624 is provided in the upright wall 472 of the channeled frame 440. The curved guide segment 130 is mounted in fixed relation to the table framework 60 by passing the screw 622 through the through hole 620 of the hub 600 and threading the screw 622 into the corresponding threaded hole 624 in the upright wall 472 of the channeled frame 440. In an alternate form, the hub 600 may include a radially extending hole therein that protrudes in a vertical direction and the upright wall 472 may include a corresponding threaded hole that extends in a vertical direction, the vertical direction being up and down in FIG. 13, so that the screw 622 may be inserted from a vertical direction, that is, from above in FIG. 13, to secure the hub 600 to the upright wall 472.

FIGS. 14, 16, 18, 19 and 21 show the position of the curved guide segment 130 relative to the sheave 120, the table framework 60, and the column framework 50. As shown in FIGS. 18 and 19, the first U-shape opening 604 is configured to align with the sheave 120 and the second U-shape opening 606 is configured to align with an opening 630 in the lower wall 360 of the table framework 60. In the illustrated embodiment, the opening 630 is positioned such that when the tabletop is in a horizontal position the opening 630 is offset from the trend axis T-T and offset from the tilt axis X-X. The cable 70 extends along a first cable travel axis J-J where the cable 70 is tangential to the outer diameter of the hub 410 of the sheave 120 and aligned with the center of the first U-shape opening 604 of the curved guide segment 130. As shown in FIGS. 14, 16 and 21, the cable 70 also extends along a second cable travel axis K-K where the cable 70 is aligned with the center of the second U-shape opening 604 and is connected to the column framework 50 to form the cable-first framework connection 350. In the illustrated embodiment, the portion of the cable 70 extending in the direction along the first cable travel axis J-J is parallel to the longitudinal direction of the tabletop 40 and the portion of the cable 70 extending in the direction along the second cable travel axis K-K is inclined relative to the longitudinal direction.

Referring to FIGS. 14 and 16, the curved guide segment 130 changes the travel path direction of the cable 70 from parallel to the longitudinal direction of the tabletop 40 to an incline of about 80 degrees relative to the longitudinal direction as the tabletop 40 moves in the first and second directions D1, D2 relative to the base 30. In FIG. 21, the curved guide segment 130 changes the travel path direction of the cable 70 from parallel to the longitudinal direction of the tabletop 40 to an incline of about 90 degrees, that is perpendicular, relative to the longitudinal direction as the tabletop 40 moves in the first and second directions D1, D2 relative to the base 30.

The cable 70 passes through the opening 630 in the lower wall 360 of the table framework 60 as the cable 70 transitions from the longitudinal direction travel path to the inclined direction travel path, and vice versa. FIGS. 16 and 19 show the table framework 60 raised to a vertically upper position, for example, by the actuators 172, 174. Owing to the offset position of the opening 630 in the lower wall 360 of the table framework 60, the inclined direction travel path, that is, that portion of the cable 70 extending downward from the table framework 60 to the column framework 50 along the second cable travel axis K-K, is transverse to the tilt axis X-X and offset from the tilt axis X-X, and transverse to the trend axis T-T and offset from the trend axis T-T. FIG. 20 shows the tilt frame 280 of the table framework 60 pivoted about the tilt axis X-X, for example, by the actuator 290. Here too, owing to the offset position of the opening 630 in the lower wall 360 of the table framework 60, the inclined direction travel path is transverse to the tilt axis X-X and offset from the tilt axis X-X. FIG. 21 shows the trend frame 180 of the table framework 60 pivoted about the trend axis T-T, for example, by the actuators 172, 174. Here too, owing to the offset position of the opening 630 in the lower wall 360 of the table framework 60, the inclined direction travel path is transverse to the trend axis T-T and offset from the trend axis T-T. In each of the foregoing movements of the table framework 60 relative to the column framework 50, the offset of the opening 630 enables the cable 70 to travel unobstructed between the tabletop 40 or table framework 60 to the column framework 50, and vice versa. This is advantageous in that the cable 70 may be directed to the outside of and/or alongside the column 140 of the surgical table 10 and away from the actuators 172, 174 located at diagonally opposite corners of the column 140 and away from the moveable linear guide elements 272, as shown in FIGS. 14 and 16, thus allowing movement of the actuators 172, 174 and moveable linear guide elements 272.

As will be appreciated, the cable take-up mechanism 20 equipped with the curved guide segment 130, in changing the travel path directions of the cable 70, enables the cable 70 to utilize space in volumes of the surgical table 10 that heretofore were not available for prior cable take-up mechanisms, for example, cable take-up mechanisms employing cable chains or sliding groove arrangements. In the illustrated embodiment, the curved guide segment 130 enables the cable 70 to move along two different travel path directions, that is, two degrees of freedom. It will be appreciated that in some embodiments multiple curved guide segments 130 may be used to provide the cable 70 with three or more travel path directions, that is three or more degrees of freedom, wherein each travel path direction is within respective different spaces in different volumes of the surgical table 10.

Figure 23:
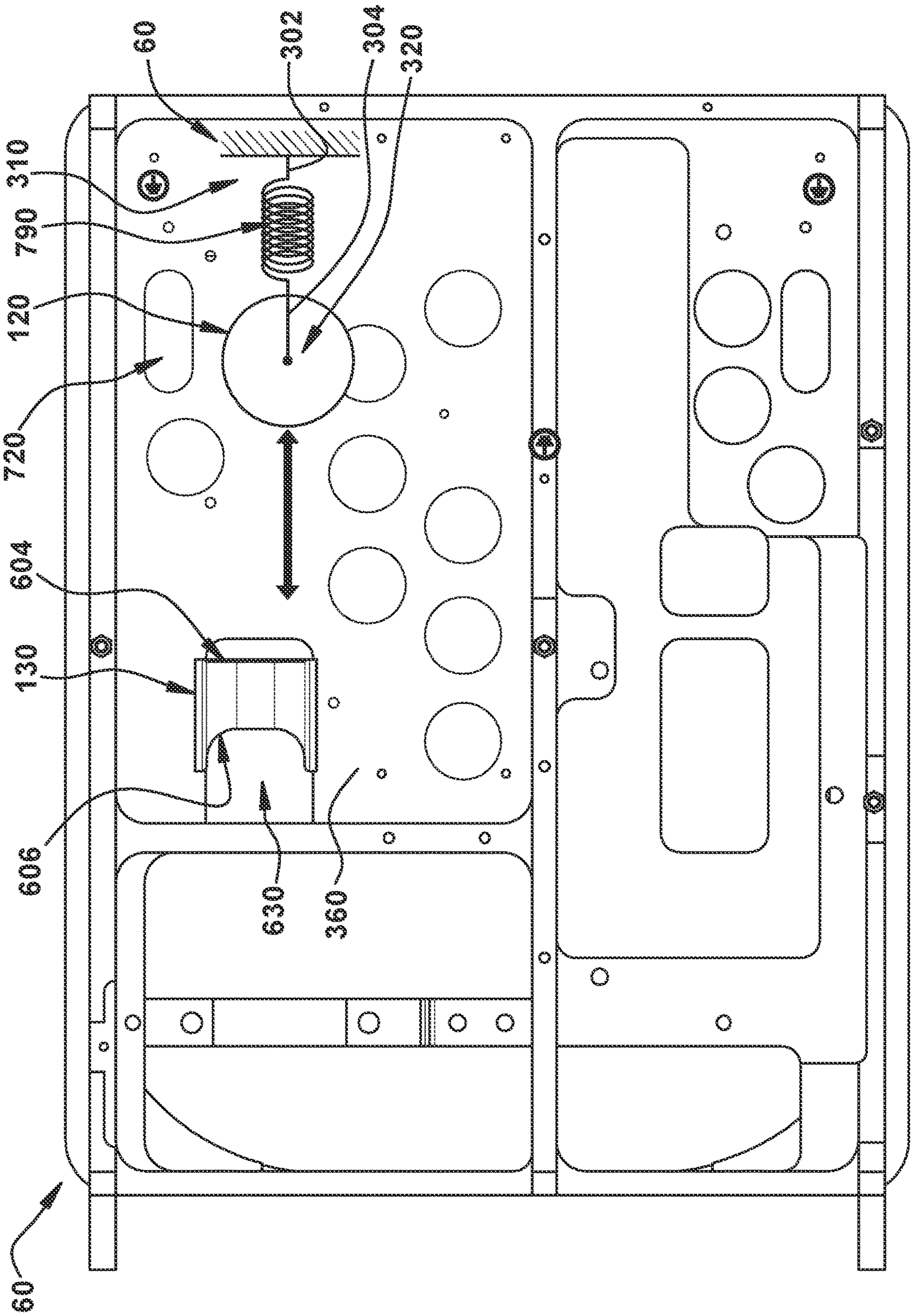
FIG. 23 is a diagrammatic view of a cable take-up mechanism in accordance with another embodiment of the invention, the cable take-up mechanism employing a tension spring.

FIG. 23 shows a table framework 60 and cable take-up mechanism 720 in accordance with another embodiment of the invention. The FIG. 23 cable take-up mechanism 720 is in many respects similar to the above-described cable take-up mechanism 20, and consequently the same reference numerals are used to denote structures corresponding to similar structures in the cable take-up mechanism 20. In addition, the foregoing description of the cable take-up mechanism 20, including the sheave 120, the curved guide segment 130, the bearing block 340, and the channeled frame 440, is equally applicable to the FIG. 23 cable take-up mechanism 720 except as noted below. Moreover, it will be appreciated upon reading and understanding the specification that aspects of the cable take-up mechanisms 20, 720 may be substituted for one another or used in conjunction with one another where applicable.

Turning then to FIG. 23, the cable take-up mechanism 720 includes a tension spring 790 coupled to the intermediate portion 76 of the cable 70 to take up slack in the cable 70 as the table framework 60 and the cable framework 50 move relative to one another to move the tabletop 40 relative to the base 30 in the first and second directions D1, D2. The cable take-up mechanism 720 may include the sheave 120 rotatably coupled to the tension spring 790 such that the cable 70 slidably wraps around the sheave 120. As will be appreciated, the coupling may be by means of a not-shown yoke, for example. In some embodiments, the sheave 120 may be omitted, in which case the intermediate portion 76 of the cable 70 may be coupled by other means to the second end portion 304 of the tension spring 790 to form the coupled spring-cable connection 320. The cable take-up mechanism 720 may include the curved guide segment 130 around which the cable 70 may bend to change a travel path direction of the cable 70 as the tabletop 40 moves in the first and second directions D1, D2 relative to the base 30. In some embodiments, the surgical table 10 may be configured without the curved guide segment 130, for example where no change in a cable travel path direction of the cable 70 is required or a change in the travel path direction of the cable 70 is accomplished by other means. Although not shown in FIG. 23, it will be appreciated that the tension spring 790 may be coupled to the intermediate portion 76 of the cable 70 by the bearing block 340. Further, the cable take-up mechanism 720 may include the channeled frame 440 to constrain the bearing block 340 to sliding linear movement via the linear channel of the channeled frame 440, thus ensuring that the bearing block 340 and thus the tension spring 790 mounted thereto move along a linear path and do not shift or sag within the table framework 60 and/or the tabletop 40 during raising and lowering and/or tilting and/or trending of the tabletop 40.

Figure 24:
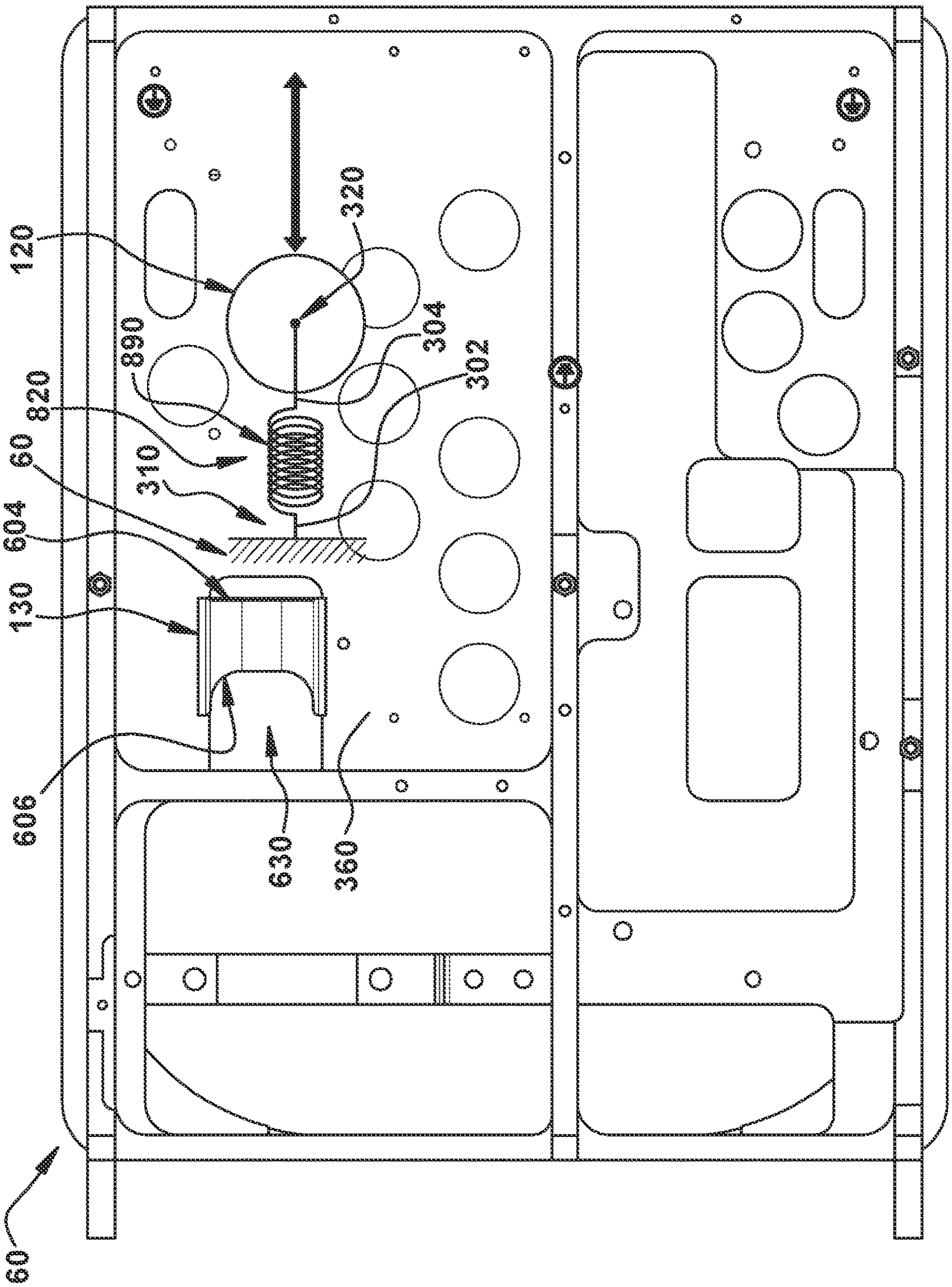
FIG. 24 is a diagrammatic view of a cable take-up mechanism in accordance with another embodiment of the invention, the cable take-up mechanism employing a compression spring.

FIG. 24 shows a table framework 60 and cable take-up mechanism 820 in accordance with another embodiment of the invention. The FIG. 24 cable take-up mechanism 820 is in many respects similar to the above-described cable take-up mechanisms 20, 720 and consequently the same reference numerals are used to denote structures corresponding to similar structures in the cable take-up mechanisms 20, 720. In addition, the foregoing description of the cable take-up mechanisms 20, 720 including the sheave 120, the curved guide segment 130, the bearing block 340, and the channeled frame 440, is equally applicable to the FIG. 24 cable take-up mechanism 820 except as noted below. Moreover, it will be appreciated upon reading and understanding the specification that aspects of the cable take-up mechanisms 20, 720, 820 may be substituted for one another or used in conjunction with one another where applicable.

Turning then to FIG. 24, the cable take-up mechanism 820 includes a compression spring 890 coupled to the intermediate portion 76 of the cable 70 to take up slack in the cable 70 as the table framework 60 and the cable framework 50 move relative to one another to move the tabletop 40 relative to the base 30 in the first and second directions D1, D2. The cable take-up mechanism 820 may include the sheave 120 rotatably coupled to the compression spring 890 such that the cable 70 slidably wraps around the sheave 120. As will be appreciated, the coupling may be by means of a not-shown yoke, for example. In some embodiments, the sheave 120 may be omitted, in which case the intermediate portion 76 of the cable 70 may be coupled by other means to the second end portion 304 of the compression spring 890 to form the coupled spring-cable connection 320. The cable take-up mechanism 820 may include the curved guide segment 130 around which the cable 70 may bend to change a travel path direction of the cable 70 as the tabletop 40 moves in the first and second directions D1, D2 relative to the base 30. In some embodiments, the surgical table 10 may be configured without the curved guide segment 130, for example where no change in a cable travel path direction of the cable 70 is required or a change in the travel path direction of the cable 70 is accomplished by other means. Although not shown in FIG. 24, it will be appreciated that the compression spring 890 may be coupled to the intermediate portion 76 of the cable 70 by the bearing block 340. Further, the cable take-up mechanism 820 may include the channeled frame 440 to constrain the bearing block 340 to sliding linear movement via the linear channel of the channeled frame 440, thus ensuring that the bearing block 340 and thus the compression spring 890 mounted thereto move along a linear path and do not shift or sag within the table framework 60 and/or the tabletop 40 during raising and lowering and/or tilting and/or trending of the tabletop 40.

As will be appreciated, in some embodiments, the cable take-up mechanism constrains the rotating sheave to a linear motion on a bearing block. In some embodiments, the cable may enter one side of the sheave and exit the other side after changing direction. In some embodiments, the cable take-up mechanism may include a constant-force spring to exert a constant force or near constant force on the bearing block which in turn maintains a constant tension on the cable. The cable take-up mechanism may allow a constant tension to be applied to the cable while retracting 10 inches of the cable's length. The design can be adjusted for shorter or longer lengths as needed. This prevents the cable from being stressed unnecessarily at the spring's extended condition. The constant tension, or near constant tension, may be accomplished in the constant-force spring coil acting on the sheave. In some embodiments, the constant-force spring could be replaced by a tension spring or compression spring or any other suitable spring as noted above, depending on the available volume and desired spring performance profile. The constant-force spring is a compact way to apply tension to the cable through a relatively large range of motion. The range of motion typically will be limited only by the space available for the diameter of the retracted constant-force spring coil, whereas prior systems were limited by the range of motion of a linear or torsion spring or a hydraulic cylinder. Application of the constant tension to the cable may be by using a combination of any one or more of the constant-force spring, the bearing block, the sheave, the channeled frame, and/or the curved guide segment. The surgical table may employ the constant-force spring as part of a cable tensioning system in multiple spaces in multiple volumes of the surgical table.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A surgical table, comprising:

a base;

a tabletop;

a first framework and a second framework moveable relative to one another to move the tabletop relative to the base in a first direction and a second direction that is opposite the first direction;

a cable having a first end, a second end that is opposite the first end, and an intermediate portion, the first and second ends being mounted to the respective first and second frameworks; and a cable take-up mechanism including a constant-force spring coupled to the intermediate portion of the cable to take up slack in the cable as the first and second frameworks move relative to one another to move the tabletop relative to the base.

2. The surgical table according to claim 1, wherein the constant-force spring has a first end portion and a second end portion that is opposite the first end portion, the first end portion being mounted to the second framework to form a coupled spring-second framework connection, the second end portion being coupled to the intermediate portion of the cable for movement together as a coupled spring-cable connection.

3. The surgical table according to claim 2, wherein the constant-force spring is configured to extend the coupled spring-cable connection relative to the coupled spring-second framework connection as the tabletop moves in the first direction relative to the base, and to retract the coupled spring-cable connection relative to the coupled spring-second framework connection as the tabletop moves in the second direction relative to the base.

4. The surgical table according to claim 1, wherein the first framework includes an upper column element of a column including upper and lower telescoping column elements, and the tabletop is connected to the second framework, wherein the first end of the cable is mounted to the upper column element at a cable-first framework connection, and wherein the tabletop together with the second framework is moveable relative to the cable-first framework connection as the first and second frameworks move relative to one another.

5. The surgical table according to claim 4, wherein the second framework includes a trend frame and a tilt frame, wherein the tabletop is connected to the tilt frame, and wherein the tilt frame together with the tabletop connected thereto is pivotably movable about a tilt axis that extends through the trend frame and the tilt frame.

6. The surgical table according to claim 1, wherein the first direction and the second direction that the tabletop moves relative to the base is respectively a vertically upward direction and a vertically downward direction.

7. The surgical table according to claim 1 $, further comprising at least one electrical actuator for moving the first framework and the second framework relative to one another.

8. The surgical table according to claim 1, wherein the constant-force spring is configured to maintain a constant tension in the cable as the tabletop moves relative to the base in the first and second directions.

9. The surgical table according to claim 1, wherein the tabletop is connected to the second framework, and wherein the constant-force spring is coupled to the intermediate portion of the cable to form a coupled spring-cable connection that is arranged for movement within the outermost dimensions of the tabletop and/or the second framework.

10. The surgical table according to claim 1, wherein the cable take-up mechanism includes a sheave rotatably coupled to the constant-force spring, and wherein the cable slidably wraps around the sheave.

11. The surgical table according to claim 10, wherein the cable slidably wraps around the sheave in the range of 5 to 180 degrees.

12. The surgical table according to claim 10, wherein the tabletop is connected to the second framework, and wherein the sheave is arranged for movement within the outermost dimensions of the tabletop and/or the second framework as the tabletop moves relative to the base in the first and second directions.

13. The surgical table according to claim 10, wherein the constant-force spring has a first end portion and a second end portion that is opposite the first end portion, the first end portion being mounted to the second framework to form a coupled spring-second framework connection, the second end portion being coupled to the intermediate portion of the cable for movement together as a coupled spring-cable connection;

wherein the constant-force spring is configured to extend the sheave relative to the coupled spring-second framework connection as the tabletop moves in the first direction relative to the base, and to retract the sheave relative to the coupled spring-second framework connection as the tabletop moves in the second direction relative to the base.

14. The surgical table according to claim 1, wherein the cable take-up mechanism includes a channeled frame mounted to the second framework and a bearing block constrained to sliding linear movement via a linear channel of the channeled frame, and wherein the constant-force spring is coupled to the intermediate portion of the cable by the bearing block.

15. The surgical table according to claim 14, wherein the tabletop is connected to the second framework, and wherein the bearing block is arranged for movement within the outermost dimensions of the tabletop and/or the second framework as the tabletop moves relative to the base in the first and second directions.

16. The surgical table according to claim 15, wherein the cable take-up mechanism includes a sheave rotatably mounted to the bearing block, and wherein the coupled spring-cable connection includes the cable slidably wrapping around the sheave.

17. The surgical table according to claim 14, wherein the tabletop is connected to the second framework, and wherein the bearing block with the sheave rotatably mounted thereto is arranged for movement within the outermost dimensions of the tabletop and/or the second framework as the tabletop moves relative to the base in the first and second directions.

18. The surgical table according to claim 14, wherein the bearing block slides along a translation axis that is parallel to a longitudinal direction of the tabletop.

19. The surgical table according to claim 18, wherein the constant-force spring has a first end portion and a second end portion that is opposite the first end portion, the first end portion being mounted to the second framework to form a coupled spring-second framework connection, the second end portion being coupled to the intermediate portion of the cable for movement together as a coupled spring-cable connection;

wherein the constant-force spring is configured to extend the bearing block relative to the coupled spring-second framework connection as the tabletop moves in the first direction relative to the base, and to retract the bearing block relative to the coupled spring-second framework connection as the tabletop moves in the second direction relative to the base.

20. The surgical table according to claim 1, wherein a first end portion of the constant-force spring includes a coil portion and a second end portion of the constant-force spring includes a free end, and wherein the coil portion is fitted on a spool rotatably mounted to the second framework to form a coupled spring-second framework connection and the free end is coupled to the intermediate portion of the cable for movement together as a coupled spring-cable connection.

21. The surgical table according to claim 20, wherein the coil portion is configured to uncoil to extend the coupled spring-cable connection relative to the coupled spring-second framework connection as the tabletop moves in the first direction relative to the base, and to coil to retract the coupled spring-cable connection relative to the coupled spring-second framework connection as the tabletop moves in the second direction relative to the base.

22. The surgical table according to claim 1, wherein the tabletop is connected to the second framework, and the cable take-up mechanism includes a curved guide segment around which the cable bends to change a travel path direction of the cable as the tabletop moves in the first and second directions relative to the base.

23. The surgical table according to claim 22, wherein the curved guide segment is configured to change the travel path direction from parallel to a longitudinal direction of the tabletop to a direction that is inclined relative to the longitudinal direction as the tabletop moves in the first and second directions relative to the base.

24. The surgical table according to claim 1, wherein the tabletop is connected to the second framework, and the second framework is configured to pivot about a tilt axis extending in a longitudinal direction of the tabletop and at least a portion of the cable extends downward through an opening in the second framework to the first framework along a cable travel axis that is transverse to the tilt axis and offset from the tilt axis.

25. The surgical table according to claim 1, wherein the tabletop is connected to the second framework, and the second framework is configured to pivot about a trend axis extending transverse to a longitudinal direction of the tabletop and at least a portion of the cable extends downward through an opening in the second framework to the first framework along a cable travel axis that is transverse to the trend axis and offset from the trend axis.

26. The surgical table according to claim 1, wherein the cable includes one or more of wires, cables, hoses, and/or lines, and/or bundles or harnesses of wires, cables, hoses, and/or lines.

27. The surgical table according to claim 1, wherein the cable is configured to transmit one or more of power, ground, control signals, communication signals, and/or fluids.

28. A surgical table comprising:

a base;

a tabletop;

a first framework and a second framework moveable relative to one another to move the tabletop relative to the base in a first direction and a second direction that is opposite the first direction;

a cable having a first end, a second end that is opposite the first end, and an intermediate portion, the first and second ends being mounted to the respective first and second frameworks; and, a cable take-up mechanism including a spring coupled to the intermediate portion of the cable to take up slack in the cable as the first and second frameworks move relative to one another to move the tabletop relative to the base;

wherein the cable take-up mechanism includes a sheave rotatably coupled to the spring, and wherein the cable slidably wraps around the sheave.

29. The surgical table according to claim 28, wherein the cable slidably wraps around the sheave in the range of 5 to 180 degrees.

30. The surgical table according to claim 28, wherein the tabletop is connected to the second framework, and wherein the sheave is arranged for movement within the outermost dimensions of the tabletop and/or the second framework as the tabletop moves relative to the base in the first and second directions.

31. The surgical table according to claim 28, wherein the spring has a first end portion and a second end portion that is opposite the first end portion, the first end portion being mounted to the second framework to form a coupled spring-second framework connection, the second end portion being coupled to the intermediate portion of the cable for movement together as a coupled spring-cable connection;

wherein the spring is configured to extend the sheave relative to the coupled spring-second framework connection as the tabletop moves in the first direction relative to the base, and to retract the sheave relative to the coupled spring-second framework connection as the tabletop moves in the second direction relative to the base.

32. The surgical table according to claim 28, wherein the cable take-up mechanism includes a channeled frame mounted to the second framework and a bearing block constrained to sliding linear movement via a linear channel of the channeled frame, and wherein the constant-force spring is coupled to the intermediate portion of the cable by the bearing block.

33. The surgical table according to claim 32, wherein the tabletop is connected to the second framework, and wherein the bearing block is arranged for movement within the outermost dimensions of the tabletop and/or the second framework as the tabletop moves relative to the base in the first and second directions.

34. The surgical table according to claim 33, wherein the cable take-up mechanism includes a sheave rotatably mounted to the bearing block, and wherein the coupled spring-cable connection includes the cable slidably wrapping around the sheave.

35. The surgical table according to claim 32, wherein the tabletop is connected to the second framework, and wherein the bearing block with the sheave rotatably mounted thereto is arranged for movement within the outermost dimensions of the tabletop and/or the second framework as the tabletop moves relative to the base in the first and second directions.

36. The surgical table according to claim 32, wherein the bearing block slides along a translation axis that is parallel to a longitudinal direction of the tabletop.

37. The surgical table according to claim 32, wherein the spring has a first end portion and a second end portion that is opposite the first end portion, the first end portion being mounted to the second framework to form a coupled spring-second framework connection, the second end portion being coupled to the intermediate portion of the cable for movement together as a coupled spring-cable connection;

wherein the spring is configured to extend the bearing block relative to the coupled spring-second framework connection as the tabletop moves in the first direction relative to the base, and to retract the bearing block relative to the coupled spring-second framework connection as the tabletop moves in the second direction relative to the base.

38. The surgical table according to claim 28, wherein the spring includes a tension spring, a compression spring, or a constant-force spring.

39. A surgical table, comprising:

a base;

a tabletop;

a first framework and a second framework moveable relative to one another to move the tabletop relative to the base in a first direction and a second direction that is opposite the first direction;

a cable having a first end, a second end that is opposite the first end, and an intermediate portion, the first and second ends being mounted to the respective first and second frameworks; and, a cable take-up mechanism including a spring coupled to the intermediate portion of the cable to take up slack in the cable as the first and second frameworks move relative to one another to move the tabletop relative to the base;

wherein the tabletop is connected to the second framework, and the cable take-up mechanism includes a curved guide segment around which the cable bends to change a travel path direction of the cable as the tabletop moves in the first and second directions relative to the base.

40. The surgical table according to claim 39, wherein the curved guide segment is configured to change the travel path direction from parallel to a longitudinal direction of the tabletop to a direction that is inclined relative to the longitudinal direction as the tabletop moves in the first and second directions relative to the base.

41. The surgical table according to claim 39, wherein the spring includes a tension spring, a compression spring, or a constant-force spring.

* * * * *